US008769080B2

(12) United States Patent
Cancel et al.

(10) Patent No.: US 8,769,080 B2
(45) Date of Patent: *Jul. 1, 2014

(54) SYSTEM AND METHOD FOR A BEHAVIOR-TARGETED SURVEY

(75) Inventors: David Cancel, Amesbury, MA (US); Christopher C. Gillett, Westford, MA (US)

(73) Assignee: Compete, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/923,506

(22) Filed: Oct. 24, 2007

(65) Prior Publication Data

US 2008/0177779 A1    Jul. 24, 2008

Related U.S. Application Data

(63) Continuation-in-part of application No. 10/267,978, filed on Oct. 9, 2002, now Pat. No. 8,095,589, and a continuation of application No. 11/463,611, filed on Aug. 10, 2006.

(60) Provisional application No. 60/362,937, filed on Mar. 7, 2002, provisional application No. 60/363,001, filed on Mar. 7, 2002, provisional application No. 60/706,917, filed on Aug. 10, 2005.

(51) Int. Cl.
*G06F 15/173* (2006.01)

(52) U.S. Cl.
USPC ........... 709/224; 709/246; 709/250; 715/204; 715/500; 715/745; 715/738; 715/811; 707/102

(58) Field of Classification Search
USPC ........... 709/224, 246, 250; 707/102; 715/745, 715/738, 811, 204, 500; 705/14.1, 14.19, 705/14.25, 14.39
See application file for complete search history.

(56) References Cited

U.S. PATENT DOCUMENTS

| 5,126,728 | A | 6/1992 | Hall |
| 5,583,763 | A | 12/1996 | Atcheson et al. |
| 5,749,081 | A | 5/1998 | Whiteis |
| 5,914,717 | A | 6/1999 | Kleewein et al. |
| 6,334,110 | B1 | 12/2001 | Walter et al. |
| 6,574,587 | B2 * | 6/2003 | Waclawski ............... 702/186 |
| 6,707,422 | B2 | 3/2004 | Sheynblat et al. |

(Continued)

FOREIGN PATENT DOCUMENTS

| WO | WO-2007021868 A2 | 2/2007 |
| WO | WO-2007/021868 A3 | 5/2009 |
| WO | WO-2012030777 A1 | 3/2012 |

OTHER PUBLICATIONS

"U.S. Appl. No. 11/463,611, Non-Final Office Action mailed Jun. 23, 2008", OARN, 11 pgs.

(Continued)

*Primary Examiner* — Thuong Nguyen
(74) *Attorney, Agent, or Firm* — Strategic Patents, P.C.

(57) ABSTRACT

An aspect of the present invention relates to tracking a computer user's behavior and providing related visual media segments with a graphical user interface for presenting a survey. In embodiments, the survey is based on the tracked user behavior. In embodiments, the visual media segments are slide-in visual media segments and the user has preemptive control over certain aspects of the visual media segments.

20 Claims, 26 Drawing Sheets

(56) References Cited

U.S. PATENT DOCUMENTS

| | | | |
|---|---|---|---|
| 6,820,116 B1 | 11/2004 | Pyhalammi et al. | |
| 6,839,680 B1 | 1/2005 | Liu et al. | |
| 6,847,969 B1* | 1/2005 | Mathai et al. | 707/100 |
| 6,934,748 B1 | 8/2005 | Louviere et al. | |
| 6,981,040 B1 | 12/2005 | Konig et al. | |
| 7,020,082 B2* | 3/2006 | Bhagavath et al. | 370/230 |
| 7,035,855 B1 | 4/2006 | Kilger et al. | |
| 7,036,087 B1 | 4/2006 | Odom | |
| 7,162,451 B2 | 1/2007 | Berger et al. | |
| 7,165,105 B2 | 1/2007 | Reiner et al. | |
| 7,272,629 B2 | 9/2007 | Yamaura et al. | |
| 7,509,684 B2* | 3/2009 | McDonald et al. | 726/26 |
| 7,831,548 B1 | 11/2010 | Round et al. | |
| 7,840,664 B2* | 11/2010 | Dugatkin et al. | 709/224 |
| 7,883,527 B2 | 2/2011 | Matsuura et al. | |
| 7,890,451 B2 | 2/2011 | Cancel et al. | |
| 2001/0014868 A1 | 8/2001 | Herz et al. | |
| 2001/0032115 A1* | 10/2001 | Goldstein | 705/10 |
| 2001/0056405 A1 | 12/2001 | Muyres et al. | |
| 2002/0010757 A1* | 1/2002 | Granik et al. | 709/218 |
| 2002/0016731 A1* | 2/2002 | Kupersmit | 705/10 |
| 2002/0035498 A1 | 3/2002 | Kehoe et al. | |
| 2002/0038350 A1 | 3/2002 | Lambert et al. | |
| 2002/0042733 A1 | 4/2002 | Lesandrini et al. | |
| 2002/0042821 A1 | 4/2002 | Muret et al. | |
| 2002/0053078 A1 | 5/2002 | Holtz et al. | |
| 2002/0063735 A1* | 5/2002 | Tamir et al. | 345/745 |
| 2002/0065912 A1 | 5/2002 | Catchpole et al. | |
| 2002/0069037 A1 | 6/2002 | Hendrickson et al. | |
| 2002/0099824 A1 | 7/2002 | Bender et al. | |
| 2002/0100042 A1 | 7/2002 | Khoo et al. | |
| 2002/0103680 A1* | 8/2002 | Newman | 705/4 |
| 2002/0116531 A1 | 8/2002 | Chu | |
| 2002/0123359 A1* | 9/2002 | Wei et al. | 455/466 |
| 2002/0123926 A1 | 9/2002 | Bushold et al. | |
| 2002/0143933 A1 | 10/2002 | Hind et al. | |
| 2002/0196273 A1 | 12/2002 | Krause | |
| 2002/0196275 A1 | 12/2002 | Willner et al. | |
| 2002/0198791 A1 | 12/2002 | Perkowski | |
| 2003/0018677 A1 | 1/2003 | Mathur et al. | |
| 2003/0037124 A1 | 2/2003 | Yamaura et al. | |
| 2003/0053420 A1* | 3/2003 | Duckett et al. | 370/252 |
| 2003/0087652 A1 | 5/2003 | Simon et al. | |
| 2003/0105719 A1 | 6/2003 | Berger et al. | |
| 2003/0126095 A1 | 7/2003 | Allen | |
| 2003/0126250 A1 | 7/2003 | Jhanji | |
| 2003/0128818 A1 | 7/2003 | Kerr et al. | |
| 2003/0182195 A1 | 9/2003 | Kumar | |
| 2003/0189904 A1 | 10/2003 | Li | |
| 2004/0098229 A1 | 5/2004 | Error et al. | |
| 2004/0107363 A1 | 6/2004 | Monteverde | |
| 2004/0133671 A1 | 7/2004 | Taniguchi | |
| 2004/0205119 A1 | 10/2004 | Streble et al. | |
| 2005/0015723 A1 | 1/2005 | Light et al. | |
| 2005/0091673 A1 | 4/2005 | Rhoten et al. | |
| 2005/0222906 A1 | 10/2005 | Chen | |
| 2005/0235318 A1 | 10/2005 | Grauch et al. | |
| 2006/0031205 A1* | 2/2006 | Perkins et al. | 707/3 |
| 2006/0047701 A1 | 3/2006 | Maybury et al. | |
| 2006/0080554 A1 | 4/2006 | Mcdonald et al. | |
| 2006/0168054 A1 | 7/2006 | Burkhart et al. | |
| 2006/0212698 A1 | 9/2006 | Peckover | |
| 2006/0248452 A1 | 11/2006 | Lambert et al. | |
| 2006/0253434 A1 | 11/2006 | Beriker et al. | |
| 2007/0030528 A1 | 2/2007 | Quaeler et al. | |
| 2007/0043817 A1 | 2/2007 | Oliver et al. | |
| 2007/0055937 A1* | 3/2007 | Cancel et al. | 715/704 |
| 2007/0198486 A1 | 8/2007 | Abrams et al. | |
| 2007/0208751 A1 | 9/2007 | Cowan et al. | |
| 2007/0209065 A1 | 9/2007 | Branam et al. | |
| 2008/0071767 A1 | 3/2008 | Grieselhuber et al. | |
| 2008/0177778 A1 | 7/2008 | Cancel et al. | |
| 2008/0183805 A1* | 7/2008 | Cancel et al. | 709/203 |
| 2008/0183806 A1* | 7/2008 | Cancel et al. | 709/203 |
| 2008/0189253 A1 | 8/2008 | Oliver et al. | |
| 2008/0189254 A1 | 8/2008 | Cancel | |
| 2008/0189408 A1 | 8/2008 | Cancel | |
| 2008/0196098 A1 | 8/2008 | Cottrell et al. | |
| 2008/0250026 A1* | 10/2008 | Linden et al. | 707/10 |
| 2008/0300904 A1* | 12/2008 | Malcolm | 705/1 |
| 2008/0301281 A1 | 12/2008 | Wang et al. | |
| 2009/0006995 A1 | 1/2009 | Error et al. | |
| 2009/0143064 A1 | 6/2009 | Bernini et al. | |
| 2010/0030894 A1 | 2/2010 | Cancel et al. | |
| 2011/0307331 A1 | 12/2011 | Richard et al. | |

OTHER PUBLICATIONS

"U.S. Appl. No. 11/463,611, Final Office Action mailed Mar. 19, 2009", FOAR, 12 pgs.

"U.S. Appl. No. 11/463,611, Non-Final Office Action mailed Aug. 3, 2010", 17.

"U.S. Appl. No. 10/267,978. Final Office Action", Jan. 11, 2007, 1-32.

"U.S. Appl. No. 11/463,611, Final Office Action mailed Jan. 19, 2011", 17.

"U.S. Appl. No. 11/923,454 Non-Final Office Action mailed Aug. 5, 2010", 15 pages.

"U.S. Appl. No. 11/923,470, Non-Final Office Action mailed Aug. 28, 2009", 7 pgs.

"U.S. Appl. No. 11/923,454, Final Office Action mailed Aug. 19, 2009", 12 Pgs.

"U.S. Appl. No. 11/463,611, Non-Final Office Action mailed Jun. 18, 2012", 29 pages.

"U.S. Appl. No. 11/923,454, Non-Final Office Action mailed May 4, 2011", 13 pages.

"U.S. Appl. No. 11/923,485, Final Office Action mailed May 4, 2011", 11 pages.

"U.S. Appl. No. 11/938,710, Non-Final Office Action mailed May 28, 2010", 9 pages.

"U.S. Appl. No. 12/495,771, Notice of Allowance mailed May 11, 2011", 10 pages.

"U.S. Appl. No. 11/923,454, Non-Final Office Action mailed Apr. 5, 2010", 13 pages.

"U.S. Appl. No. 11/923,486, Final Office Action mailed Mar. 3, 2010", 12 pages.

"U.S. Appl. No. 11/938,716, Non-Final Office Action mailed Mar. 12, 2009", 6 pgs.

"U.S. Appl. No. 11/923,470, Non-Final Office Action mailed Feb. 22, 2010", 13 pages.

"U.S. Appl. No. 11/938,710, Notice of Allowance mailed Feb. 17, 2010", 8 Pgs.

"U.S. Appl. No. 12/495,771, Non-Final Office Action mailed Dec. 2, 2010", 11 pages.

"U.S. Appl. No. 11/923,470 Final Office Action mailed Oct. 28, 2010", 15 pages.

"U.S. Appl. No. 11/938,710, Notice of Allowance mailed Oct. 15, 2010", 9 pgs.

"U.S. Appl. No. 11/923,454, Non-Final Office Action mailed Jan. 8, 2009", 7 pgs.

"U.S. Appl. No. 11/923,485, Non-Final Office Action mailed Jan. 6, 2011", 14 pages.

"U.S. Appl. No. 11/923,454, Final Office Action mailed Jan. 6, 2006", 15 pages.

"International Application Serial No. PCT/US11/49659, Search Report and Written Opinion mailed Jan. 12, 2012", 11 pages.

"U.S. Appl. No. 11/923,485, Non-Final Office Action mailed Aug. 13, 2009", 12 pgs.

Intl. Searching Authority, "PCT Search Report", PCT/US06/31259—Jul. 11, 2008, 10 pages.

"U.S. Appl. No. 11/463,611, Final Office Action mailed Apr. 23, 2013", 22 pages.

"PCT Application No. PCT/US11/49659 International Preliminary Report of Patentability mailed Mar. 14, 2013", 6 Pages.

"U.S. Appl. No. 13/163,823, Non-Final Office Action mailed Aug. 15, 2013", 39 pages.

U.S. Appl. No. 11/463,611, Non-Final Office Action mailed Aug. 4, 2009, 16 pgs.

(56) References Cited

OTHER PUBLICATIONS

U.S. Appl. No. 11/463,611, Final Office Action mailed Apr. 23, 2013, 22 pages.

PCT Application No. PCT/US11/49659 International Preliminary Report of Patentability mailed Mar. 14, 2013, 6 Pages.
U.S. Appl. No. 13/163,823, Non-Final Office Action mailed Aug. 15, 2013, 39 pages.

* cited by examiner

SYSTEM AND METHOD FOR A BEHAVIOR-TARGETED SURVEY

CROSS-REFERENCE TO RELATED APPLICATIONS

This application claims the benefit of the following U.S. Provisional Patent Application, which is incorporated herein by reference in its entirety: Application No. 60/706,917 filed on Aug. 10, 2005 and entitled "PRESENTATION OF MEDIA SEGMENTS".

BACKGROUND

1. Field

This invention relates to methods and systems for recording user web browser click-stream events and to interacting with computer users based on those events.

2. Description of the Related Art

Web browser click-stream data are typically collected at a server site using web logs or at a particular web site. Web logs are maintained at the server site and record access to web pages, collecting available user data as the server administrators may determine. Web logs can be retrieved from web servers and may contain significant amounts of click-stream traffic data relating to activities of users that visit a server. These web logs may contain particular site navigation patterns that can be analyzed for the pages viewed. This data is captured as a post click-stream event, not in real time, and can only provide as much user information as the web server log maintains. With the web log method it may be difficult to determine the sequence of the click-stream events as users navigate through the web sites.

Another method, which may be referred to as page tagging, collects data from a particular web site by use of software placed on the web server. This web site software then collects data, as determined by the software providers, as the user browses a page. Using this method, data may be collected for the particular web sites and may maintain a record of the user's click-stream browsing in the order of the browse events.

One limitation of these web browser click-stream data collectors is that they only allow for analysis of user data from particular sites. Data and reports may only be created as to the habits of a user on the particular sites. These data collection methods cannot capture the complete browsing habits of a user across a plurality of different web sites located on a plurality of servers. With this limited click-stream data there cannot be analysis as to how one site is viewed versus another. Without collecting data from the full range of the user's web browsing, competitive comparisons of viewing trends cannot be complete.

SUMMARY

The methods and systems disclosed herein include methods and systems for providing a desktop sliding visual media segment or slider that is based on usage patterns, where a user is provided with control of presentation of the sliding visual media segment. Thus, the methods and systems provided herein include tracking a usage pattern by which a user uses a computing facility; and presenting a visual media segment on a graphical user interface associated with the user. In embodiments, the content of the visual media segment is based at least in part on the usage pattern. In embodiments, the user has at least partial preemptive control over a presentation parameter associated with the visual media segment. In embodiments, the graphical user interface is associated with at least one of a portable computing device, a laptop computing device, a desktop computing device, a phone, a cell phone, a PDA, and a mobile communication facility. In embodiments, presenting the visual media segment includes a segment that slides up from the lower menu bar of a computer screen. In embodiments, the visual media segment includes a pop-up segment on a computer screen. In embodiments, the visual media segment includes a semi-transparent visual media segment. In embodiments, the preemptive control includes the presentation of an indication that a visual media segment will appear. In embodiments, the visual media segment indication includes an alert on a toolbar. In embodiments, the alert includes a change in an icon on the toolbar. In embodiments, the alert includes presentation of an icon on the toolbar. In embodiments, the presentation parameter is a frequency of appearance parameter. In embodiments, the frequency is regulated in steps. In embodiments, the steps include high, medium and low. In embodiments, the frequency is regulated in the number of visual media segments allowed in a given period. In embodiments, the given period is at least one of day, week, month, quarter, and year. In embodiments, the presentation parameter is a size of appearance. In embodiments, the presentation parameter is a color. In embodiments, the presentation parameter is a location of the visual media segment. In embodiments, the presentation parameter includes an indication of who may send visual media segments. In embodiments, the visual media segment includes a logo. In embodiments, the visual media segment includes HTML. In embodiments, the visual media segment includes an animation. In embodiments, the animation includes flash animation. In embodiments, the visual media segment includes a survey. In embodiments, the survey relates to at least one of health, sales, communication, and service.

In embodiments, the visual media segment includes reminders relating to the user's health. In embodiments, the reminder relates to medication. In embodiments, the reminder relates to at least one of dosage, injection, intravenous intake, change of medication, time, and type of medication. In embodiments, the reminder relates to vitamins. In embodiments, the reminder relates to food. In embodiments, the reminder relates to nutrition. In embodiments, the reminder relates to a biometric measurement. In embodiments, the biometric measurement relates to blood pressure, blood sugar, heart rate, cholesterol, blood oxygen content, lung capacity, temperature.

In other embodiments, the visual media segment includes a different kind of reminder. In embodiments, the reminder relates to at least one of a contribution, contribution to an education plan, contribution to a savings plan, contribution to a retirement plan, and a payment. In embodiments, the visual media segment includes a message segment. In embodiments, the message segment is adapted for two-way communication. In embodiments, the message segment is adapted for one-way communication. In embodiments, the message is associated with a service provider of the user. In embodiments, the message segment includes an offer. In embodiments, the offer is for at least one of goods, services, sale of goods, sale of services, rental of goods, and rental of services. In embodiments, the offer is related to the usage pattern. In embodiments, the service provider is at least one of the user's cell phone service provider, credit provider, credit card provider, bank, school, credit report provider, power provider, electric provider, gas provider, broker, and financial analyst.

In embodiments, the visual media segment includes an advertisement. In embodiments, the advertisement includes a motion component. In embodiments, the advertisement includes video segment. In embodiments, the video segment includes a video. In embodiments, the video segment includes a movie.

In embodiments, the step of sliding the visual media segment further includes sliding the visual media segment without prompting from the user. In embodiments, the visual media segment provides information from a service provider of the user. In embodiments, the information includes at least one of cell minutes, phone minutes, account balance, account transaction information, and music downloads. In embodiments, the information is provided on a real-time basis. In embodiments, the method further includes the step of downloading client software to be regulated by the user. In embodiments, the client software provides at least one tool to be located on a tool bar. In embodiments, the at least one tool includes a presentation regulation tool. In embodiments, the presentation regulation tool regulates the presentation parameter. In embodiments, the client software provides at least one tool bar. In embodiments, the methods and systems further include the step of configuring server software to be regulated by the user. In embodiments, the server software provides at least one tool to be located on a tool bar. In embodiments, the at least one tool includes a presentation regulation tool. In embodiments, the presentation regulation tool regulates the presentation parameter. In embodiments, the server software provides at least one tool bar. In embodiments, the method further includes the step of distributing the visual media segment. In embodiments, the distribution includes broadcasting the visual media segment to a plurality of computer facility users. In embodiments, the distribution is targeted. In embodiments, the targeting is based on an action the user performed. In embodiments, the user performed the action using a computing facility. In embodiments, the method is deployed to connect a service provider with its customer. In embodiments, the user is the customer. In embodiments, the visual media segment is adapted with a two-way communication facility. In embodiments, the method is deployed to connect a product provider with its customer. In embodiments, the user is the customer. In embodiments, the visual media segment is adapted with a two-way communication facility. In embodiments, the usage pattern includes at least one of webpage usage, purchases, economic transactions, high worth transactions, and service provider interactions.

Methods and systems provided herein may also include methods and systems for presenting a user with an indication of the user's worth as attributed by others based on usage patterns. The methods and systems may include tracking a usage pattern of a user of a computing facility; attributing a value that is ascribed to the user by another based on the usage pattern; and presenting the user with an indicator of the ascribed value. In embodiments, the value reflects the value of the user to a service provider. In embodiments, the value is ascribed based on a prediction of a future behavior of the user. In embodiments, the future behavior is a predicted purchase. In embodiments, the value is ascribed based on an observed preference of the user. In embodiments, the preference is observed based on a pattern of online behavior by the user. In embodiments, the preference is indicated directly by the user. In embodiments, the preference is indicated by a survey. In embodiments, the value is ascribed based on the execution of a transaction by the user using the computing facility. In embodiments, the transaction is a purchase. In embodiments, the transaction is a sale. In embodiments, the transaction is shopping. In embodiments, the transaction is a click-through to a link. In embodiments, the transaction is a bid. In embodiments, the transaction is an offer to purchase at least one of a good and a service. In embodiments, the transaction is observation of an advertisement. In embodiments, the transaction is a message. In embodiments, the transaction is a mouse movement. In embodiments, the transaction is submission of a form. In embodiments, the transaction is completion of a survey. In embodiments, the user is presented with information about how the value of the user's usage is determined. In embodiments, information about how the value of a user's usage pattern is determined is withheld from the user. In embodiments, presenting the ascribed value includes presenting a visual media segment on a graphical user interface associated with the user. In embodiments, the visual media segment is a slide menu that slides up from a tool bar. In embodiments, the visual media segment is a pop-up segment. In embodiments, the visual media segment is a bar indicator, a square, a rectangle, an oval, a depiction of an item of goods (such as an automobile), a depiction of a financial instrument (such as a check), or the like. In embodiments, the user's worth is measured in worth to a service provider. In embodiments, the worth includes worth as measured by an advertiser. In embodiments, the user's worth is measured in worth to a product provider. In embodiments, the user's worth is based on the frequency with which a user permits presentation of a visual display to the user. In embodiments, the user's worth is based on a profile of the user based on the user's usage pattern. In embodiments, the profile is created based on an accumulation of transactions by the user. In embodiments, the accumulation of transactions facilitate an estimate of the net worth of the user. In embodiments, the accumulation of transactions facilitate a prediction of the price at which a user will purchase at least one of a good and a service.

Methods and systems disclosed herein may also include a sliding visual media segment that includes at least one offer, where the user can make an election to earn worth points. Such methods and systems may include presenting an offer to a user associated with a more link to indicate more information on the offer is desired and a no more link to indicate no further information on the offer is desired and attributing a value to each action of the user in response to the offer. In embodiments, the value includes worth as measured by a service provider. In embodiments, the value includes worth as measured by an advertiser. In embodiments, the value includes worth as measured by a product provider.

Methods and systems disclosed herein may also include methods for providing client software for tracking and communicating with preemptive parameter control. Such methods and systems may include providing communication software adapted to track a usage pattern of a user of a computing facility through the presentation of a visual media segment on a graphical user interface associated with the user based at least in part on the usage pattern. In embodiments, the user has at least partial preemptive control over a presentation parameter associated with the visual media segment. The methods and systems may also include establishing a loyalty sign-up panel associated with a service provider, presenting a description of a loyalty program and allowing a user to download software to enable the tracking of the usage pattern.

Methods and systems may also include methods and systems for providing a slide-up visual media segment for presentation on a graphical user interface of a user and allowing a user to execute an action within the slide-up visual media segment with a single action of the user. In embodiments, the action is execution of a transaction. In embodiments, the action is setting a parameter. In embodiments, the action is related to a promotion presented to the user in the visual media segment. In embodiments, the action is purchase of goods. In embodiments, the action is viewing of an offer. In embodiments, the action is joining a loyalty program. In embodiments, the action is purchase of a service. In embodiments, the action is viewing an advertisement. In embodiments, the action is sending the visual media segment to another user. In embodiments, sending the visual media segment causes the user to receive a reward.

Methods and systems disclosed herein also include methods and systems for providing a slide-up visual media segment for presentation on a graphical user interface of a user and enabling bidirectional communication within the slide-up visual media segment. In embodiments, the communication includes a message from an advertiser. In embodiments, the communication includes an offer and allows acceptance of the offer. In embodiments, the communication enables formation of an agreement. In embodiments, the communication enables setting of a parameter for further communication. In embodiments, the communication is between a user and a marketer. The methods and systems may also include tracking a usage pattern of the user. In embodiments, the communication is based on a usage pattern of the user, such as any of the usage patterns described elsewhere herein.

Methods and systems disclosed herein include methods and systems for tracking the usage pattern of a computer facility by a user; presenting the usage pattern to a plurality of marketers; and attributing a value to the user based on an auction among the marketers. The methods and systems may also include presenting the user a visual media segment that represents the value attributed to the user based on the auction. The methods and systems may also include allowing a subset of marketers to interact with the user based on the results of the auction. In embodiments, the number of marketers allowed to interact with the user is determined based on a parameter set by the user. In embodiments, the user sets the parameter within a visual media segment presented to the user.

Methods and systems disclosed herein also include methods and systems for providing a slide up visual media segment with account information of a user. The methods and systems include methods and systems for presenting a visual media segment in the graphical user interface of a user device and displaying account information for a user account within the visual media segment. In embodiments, the account information is account information for an account the user has with a service provider. In embodiments, the visual media segment includes account information for more than one account from a service provider. In embodiments, the user can execute a transaction associated with the account by taking an action entirely within the visual media segment. In embodiments, the account information is information from more than one service provider. In embodiments, the account information is collected using a client-side application installed on the user's computer. In embodiments, the account information accesses a security item located on the user's computer. In embodiments, the security item is a stored password. In embodiments, the security item is a password entered in the visual media segment. In embodiments, the account is selected from the group consisting of a bank account, a savings account, a retirement account, an investment account, a checking account, a credit card account, a debit card account, a store account, a loyalty program account, an airline miles account, a hotel reward program account, a rental car account, an account for a utility, an account for a telecommunications service, an account for a television service, an account for a personal service, an account for a home service, an insurance account, a mortgage account, and a tax account. In embodiments, the account information is collect using server-side software. The methods and systems may also include tracking a usage pattern of the user of the computing facility and presenting a selected visual media segment based on the usage pattern. In embodiments, the visual media segment allows the user to pay a bill based on an action of the user entirely within the visual media segment.

Provided herein are methods and systems for a data collecting platform (DCP) that records web browser click event data and provides a record of user on-line activity. The DCP may provide a data collection agent (DCA) and an update agent (UA) that reside on a user client station and a remote data collection server (DCS) to collect the recorded user on-line activity from the client station. The collected on-line activity may then be analyzed to determine how competitive sites may be viewed by the users.

One industry in which on-line behavior is highly relevant is the auto industry. In an embodiment, an auto manufacturer may wish to know how Internet viewers are researching a particular model versus a competitor's similar model. Based on the browser click event data from a plurality of web browser users, the data may be analyzed to determine which of two models has more viewings. In another embodiment, the same manufacturer may receive data that a different model of auto has become the primary competition for its model, therefore requiring a change in marketing strategy. Similar analysis may be made in many other industries.

In an embodiment, the (DCA) may record the web browser click events of the user and may be activated as the client station operating system is booted. The DCA may remain active until the operating system is shut down. As the client station operating system boots up, the DCA may connect with the DCS for a time stamp that may be used for all future time recording of the web browser click events. In an embodiment, this time stamp request may assure that the plurality of DCA users click event data are based on the same clock. Therefore, as data is reviewed at a later date, the browser click events may be presented in the order of the events on one clock as opposed to the plurality of individual non-synchronized client station clocks. In an embodiment, the DCA may comprise a browser event plug-in, event state machine, rules engine, data recorder, update agent monitor, network performance monitor, DCS monitor, configuration engine, or other component that may be required to support web browser click event recording.

In an embodiment, the DCA may have operational parameters that may be used by the various components of the DCA. In an embodiment, the operation parameters may be requested from the DCS through an HTTPS or HTTP connection. A configuration engine may process the operational parameters that may be in an XML file, SQL table, OBDC table, Jet database, ASCII file, or other data format. Once the DCA receives new operational parameters, the configuration engine may update the DCA.

In an embodiment, the client station may record the browser click event with a plurality of threads that monitor web browser activity and capture the web browser click events. The plurality of threads may be calculated by the connection throughput that may be determined by the network performance monitor (NPM). In an embodiment, periodically downloading a fixed length document and measuring the response time may determine the connection throughput and therefore determine the number of threads used by the DCA.

In an embodiment, the web browser may be Microsoft Internet explorer (MSIE), AOL, Netscape or other compatible web browser. The DCA may use the web browser plug-in or similar capability as the method to detect the event. The web browser click event data may be recorded in a first-in-first-out (FIFO) queue as the user browses the web. The data recorder may adjust the FIFO queue order based on the operational parameters available on the client station. In an embodiment, the web browser click event data may be ordered into categories of collected data. The data recorder may transmit the data to the data collection server (DCS) for additional data processing. The data may be transmitted by HTTPS using the POST or other method. The DCS then may reply to the DCA with an XML file, SQL table, OBDC table, Jet database, ASCII file, or other data format. The data may be transmitted by HTTP if a HTTPS connection is not accessible.

In an embodiment, the web browser click event may be processed by the event state machine (ESM) whereby the web browser click event may be determined to be pertinent. Rules for web browser click events being pertinent may be determined by the operational parameters downloaded from the DCS. Non-pertinent web browser click events are discarded, and no further processing may be performed on non-pertinent web browser click events. The web browser click event output may be the URL information of the web site visited and additional data, such as user ID, date, time, event type, or other available data passed to the rules engine.

In an embodiment, the rules engine may transform the ESM web browser click event output by deleting information such as user name, password, account numbers, or like personal data. The rules engine may present additional actions based on user web browsing activity in that a secondary web browser window may be opened. In an embodiment, the secondary web browser window may require a user interaction such as an on-line survey or other user action. In an embodiment, the rules engine may request new rules from DCS in the form of an XML file, SQL table, OBDC table, Jet database, ASCII file, or other data format, and the new rules may over write existing rules. There may be a graphical user interface (GUI) provided to DCS administrators to allow adding or editing of rules. The added or edited rules may be for subsequent web browser click events once downloaded to the DCA. After the rules engine completes the web browser click event transformations, the web browser click events may be transmitted to the data recorder and may be sent as a click-stream file to the DCS.

In an embodiment, the event logger may record operational events such as application start, application stop, application re-starts, or other application operation events. The operational events that may be transmitted to DCS may be a separate file from a click-stream file.

In an embodiment, there may be a UA that may download software updates from the DCS. If an update is available from the DCS, the update may be downloaded and launched. In an embodiment, the download may be received in an installation facility, which may include an executable script such as a Nullsoft Scriptable Install System (NSIS) from Nullsoft. In an embodiment, the update may execute on the client station in a sequence that may comprise un-compression of the update, shut down of required software, installation of new update, changes to the Registry (e.g. Microsoft® Windows® Registry) that reflect the nature of the update, and restart of the software. The sequence of downloading and installing new software updates may run as a background application and may be unnoticed by the user. In an embodiment, the UA may verify that the DCA is operational, and the DCA may verify that the UA is operational. The UA may restart the DCA or the DCA may restart the UA.

In an embodiment, the DCS may be a collection of dedicated software, off the shelf software, custom software, and storage that may record click-stream data from the DCA. In an embodiment, the DCA may accrue raw events from a plurality of users into at least one raw event file; these files may be based on a one to one mapping of DCS servers to raw event logs. The DCA may then transmit the raw event files to a holding area for aggregation.

As used herein the term "Voicebox" refers to software developed by Compete, Inc. used to generate visual media segments as described in more detail herein.

BRIEF DESCRIPTION OF FIGURES

The systems and methods described herein may be understood by reference to the following figures.

DETAILED DESCRIPTION OF THE FIGURES

Figure 1:
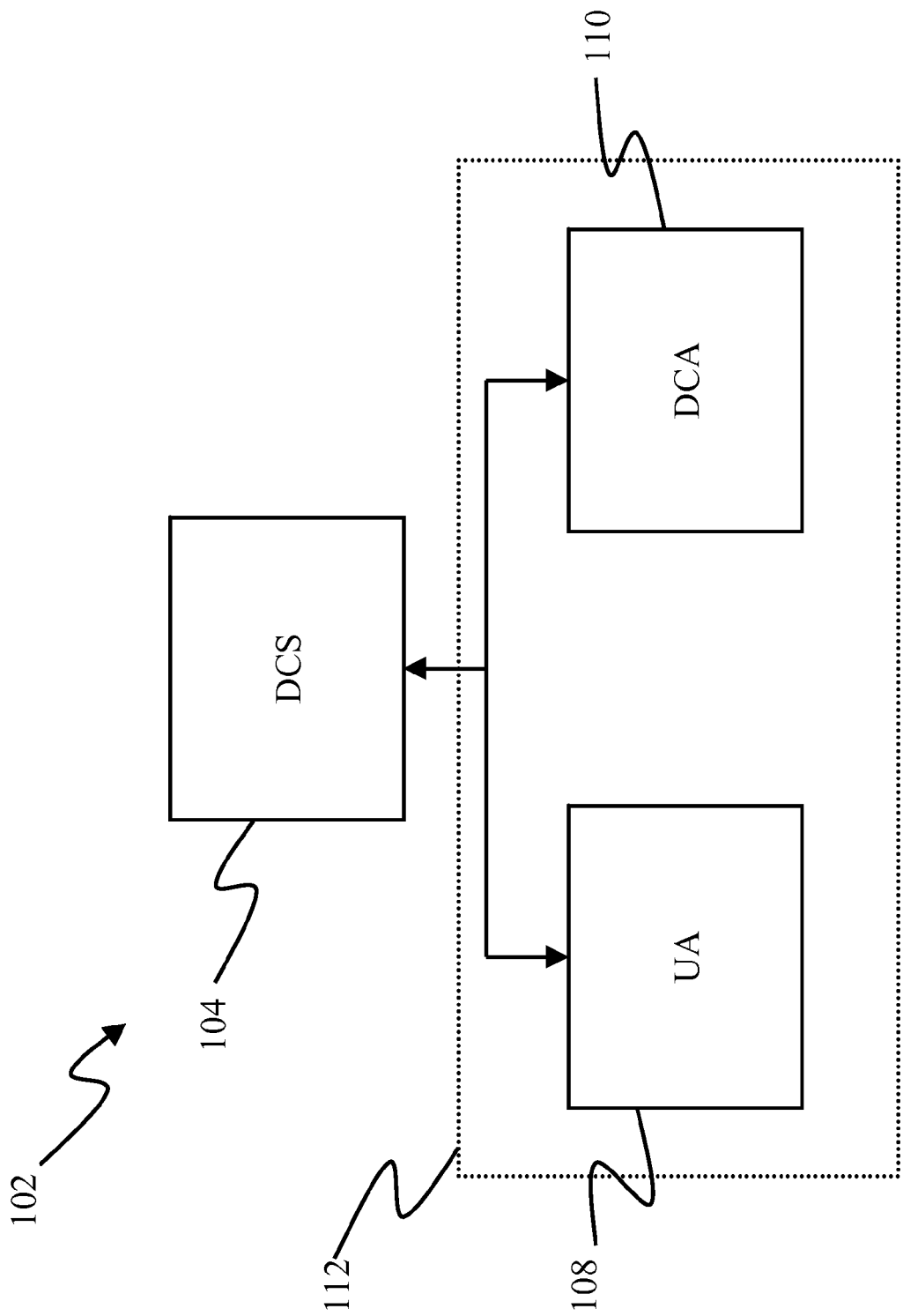
FIG. 1 shows the Data Collection Platform (DCP) according to the principles of the present invention.

Referring to FIG. 1, an embodiment of the Data Collection Platform (DCP) 102 is shown. The data collection server (DCS) 104 may be a remote server and may communicate with the client station 112 by HTTPS or HTTP connection. In an embodiment, the update agent (UA) 108 and the data collection agent (DCA) 110 may be located on the client station 112. The responsibility of the UA 108 may be to manage the downloading of software updates from the DCS 104 and to launch the updates. In an embodiment, at a time determined by the client station 112 configuration, the UA 108 may inquire if software updates are available from the DCS 104. The UA 108 may download the update from the URL specified in the client station 112 configuration file and may store the file for future update on the client station 112. The UA 108 may update the Registry of the client station 112 with the name of the software update executable. The UA 108 may start the update process for example by running the available executable defined in the Registry of the client station 112. The update executable may perform all sequences that are required to provide the update to the DCA 110.

The DCA 110 is responsible for the recording of the user web browser click event data as the user navigates the web. The DCA 110 may contain several specialized components to record and modify the web browser click event before a click-stream file is transmitted to the DCS 104. In an embodiment, the DCA 110 may interact with the client station 112 web browser using the web browser plug-in capability or using helper object capability, or a similar capability. The web browser may be Microsoft Internet Explorer®, America on Line®, Netscape®, or other web browser. In an embodiment, once the web browser click event is recorded, the DCA 110 may determine if the web browser click event is pertinent, remove personal data, reorder the web browser click event, or otherwise modify data prior to sending a click-stream file to the DCS 104. The determination of how the web browser click event data may be modified may be stored in a file maintained in the client station 112.

In an embodiment, the DCA 110 is activated when the client station 112 operating system is booted and may remain active until the client station 112 is powered off. In an embodiment, the UA 108 and the DCA 110 may be self-maintaining in that each may verify that the other is active. In an embodiment, if the UA 108 determined that the DCA 110 was not active, the UA 108 may reactivate the DCA 110. The DCA 110 may reactivate the UA if it was determined to be inactive. In an embodiment, the DCA 110 and UA 108 may be able to maintain their own operational state and be self-correcting.

Figure 2:
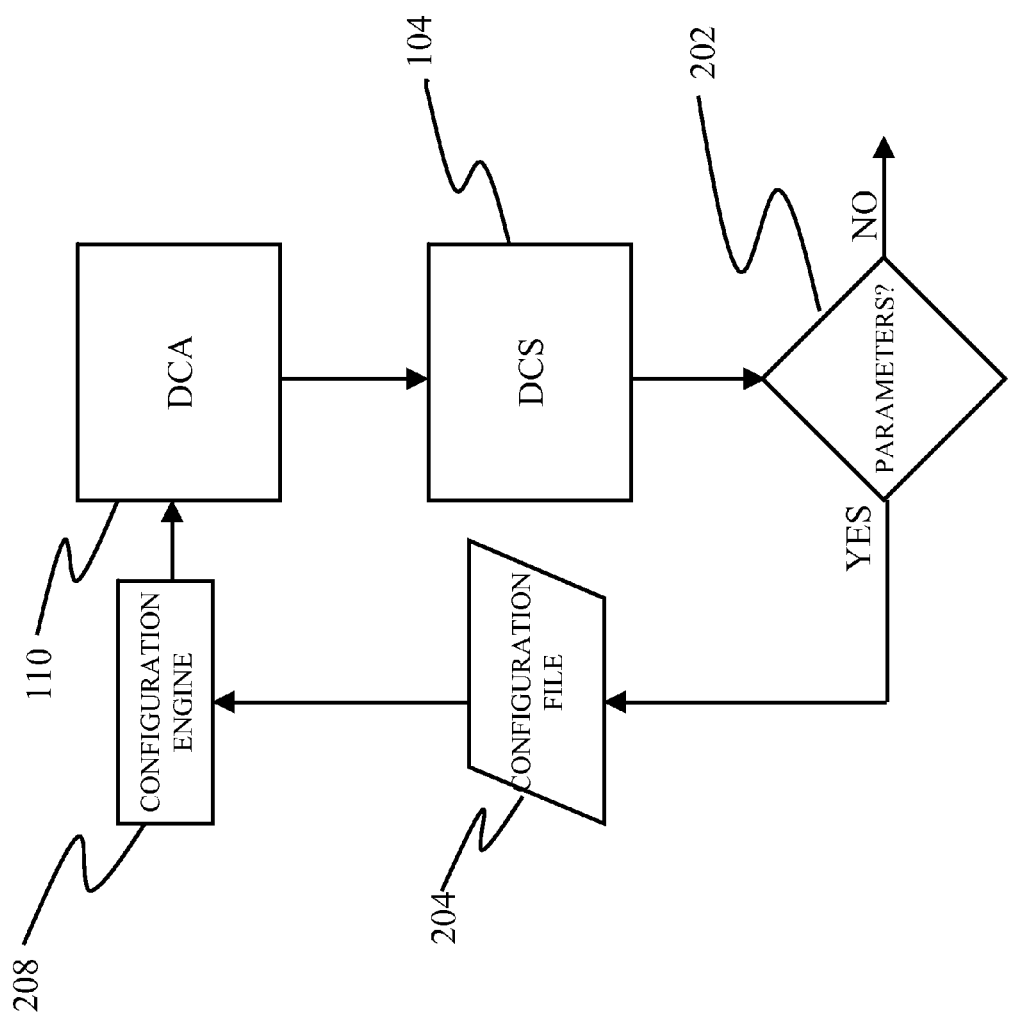
FIG. 2 shows the communication between the DCA and DCS for parameter updates according to the principles of the present invention.

Referring to FIG. 2 the embodiment of the communication between the DCA 110 and DCS 104 for parameter updates is shown. The DCA 110 may be configurable in that a configuration file 204 may contain operational parameters for the DCA 110 operation. In an embodiment, the DCA 110 may request whether new operational parameters are available on the DCS 104. The DCA 110 request regarding operational parameters may be based on the DCA 110 version, configuration file, internal DCA 110 timer, or other method. The DCS 104 may have a decision sequence 202 to determine if there are new operational parameters available for the DCA 110. If there are new operational parameters, the configuration file 204 may be transmitted in an XML file, SQL table, OBDC table, Jet database, ASCII file, or other data format to the DCA 110.

In an embodiment, the DCA 110 may feature a configuration engine 208 that updates the DCA 110 with the latest configuration file 204. The configuration engine 208 may make changes to the configuration file in the DCA 110.

Figure 3:
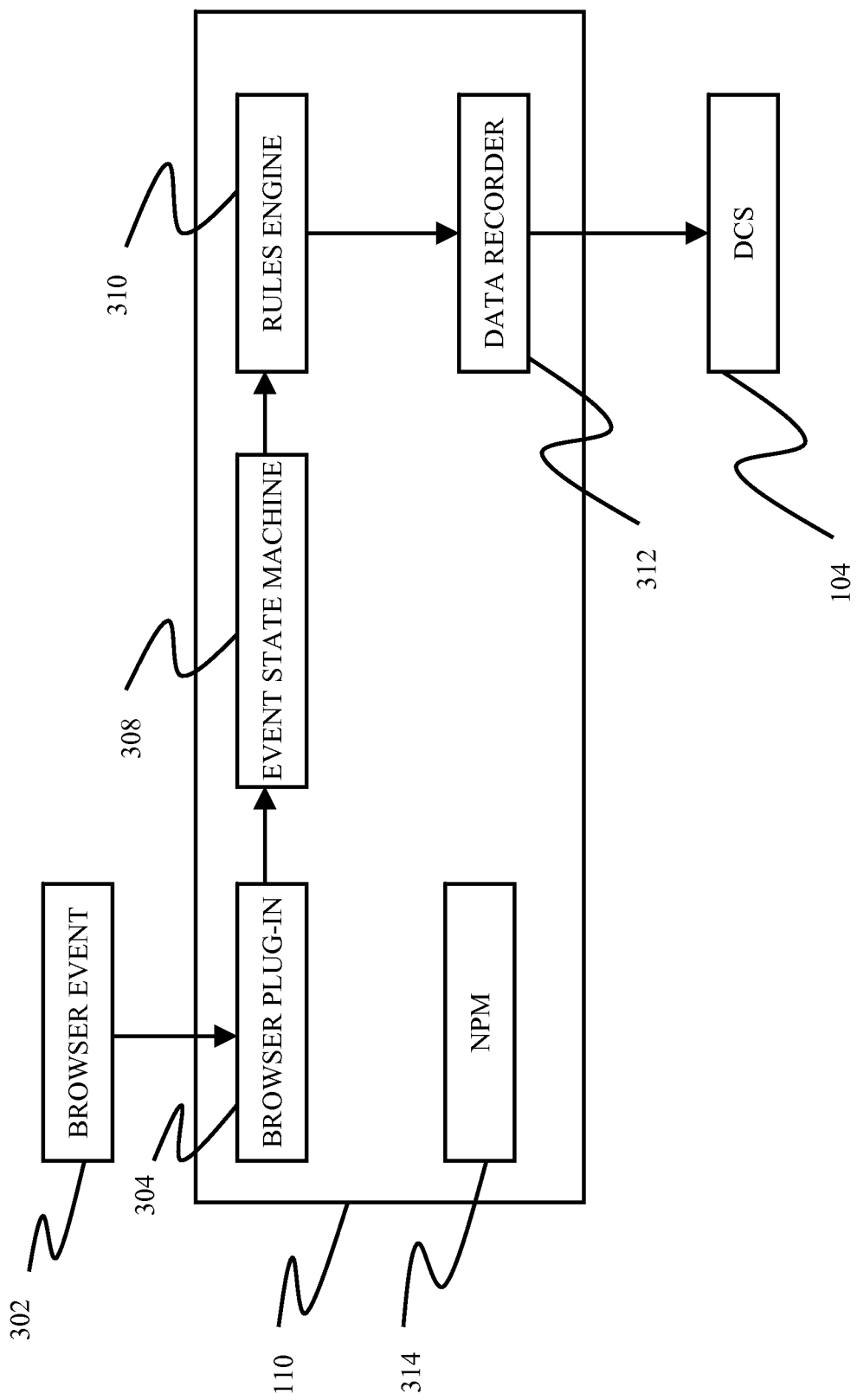
FIG. 3 shows the DCA according to the principles of the present invention.

Referring to FIG. 3, an embodiment of the DCA 110 components may be shown. The user on a client station 112 may initiate a web browser click-event 302. The web browser click event 302 may be any navigation the user initiates with a supported web browser. In an embodiment, the various components of the DCA may be multi-threaded; for example, the browser plug-in 304 may be multi-threaded to record the user click-stream. The number of threads of the data recorder 312 may be determined by the connection speed of the client station 112, as measured by the network performance monitor (NPM) 314, which may determine the connection speed by periodically downloading a fixed length document and measuring response speed.

In an embodiment, the browser plug-in 304 may record the web browser click event and may pass the recorded web browser click event to the ESM 308. In an embodiment, based on rules, the ESM 308 may determine if a web browser click event or group of web browser click events is pertinent. A web browser click event that is determined to be non-pertinent may be discarded and not reported to the DCS 104. A web browser click event that is determined to be pertinent by the ESM 308 may have information such as the URL, user ID, data, time, event type, or other information added to the web browser click event data.

The ESM 308 may transmit all pertinent web browser click events to the rules engine 310. In an embodiment, it is critical to protect the anonymity of users running the DCA 110; therefore, all personal data may be removed from the web browser click event. A rules file may be maintained as an XML file, SQL table, OBDC table, Jet database, ASCII file, or other data format. In an embodiment, the rules engine may use the rules file to remove the personal information by replacing the personal information with another character. In another embodiment, the rules engine 310 may detect patterns of user behavior such as navigating to a complex list of sites within a certain time. Based on this behavior the rules engine 310 may initiate a new browser window requesting further user action, such as asking the user to participate in an on-line survey.

The rules engine 310 may transmit the web browser click event to a thread of the data recorder 312. In an embodiment, it may be the responsibility of the thread of the data recorder 312 to buffer the transformed web browser click events into a click-stream and transmit the final click-stream to the DCS 104. The thread of the data recorder 312 may transmit the click-stream to the DCS 104 by HTTPS or HTTP using the POST or other method. In an embodiment, the thread of the data recorder 312 may determine if a connection exists to transmit the click-stream to the DCS 104. If no connection exists the thread of the data recorder 312 may buffer the click-stream until a connection is established with the DCS 104, when all buffered data may be transmitted. In an embodiment, there may be a plurality of data recorders 312 and the data recorders 312 (or threads thereof) may revise the order of the received web browser click events before transmitting the click-stream file to the DCS 104.

Figure 4:
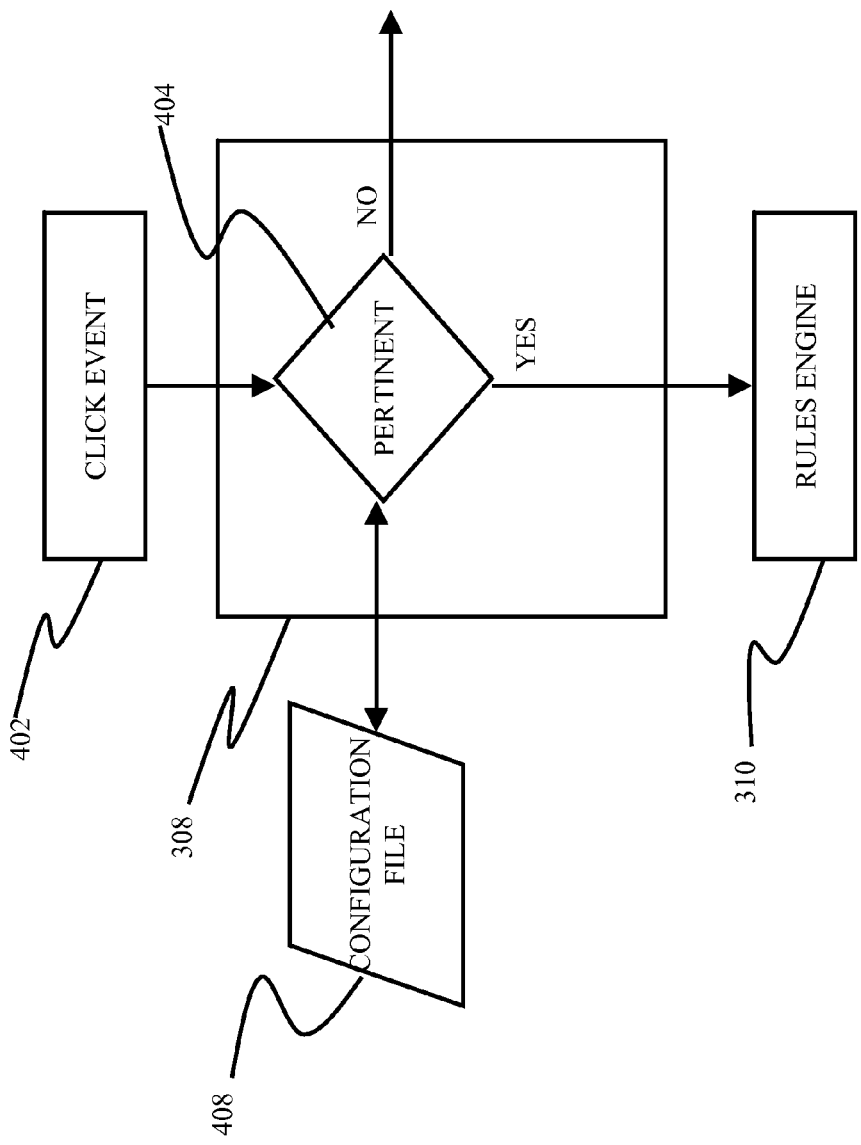
FIG. 4 shows the Event State Machine (ESM) according to the principles of the present invention.

Referring to FIG. 4, an embodiment of the Event State Machine (ESM) 308 is shown. In an embodiment, the web browser click event 402 may be transmitted to the ESM 308 where there may be a pertinent sequence 404 to determine if the web browser click event 402 is useful. In an embodiment, the pertinent sequence 404 may use a configuration file 408 to retrieve the rules for pertinent web browser click event determination. Non-pertinent click-streams may be discarded, and no further processing may be performed on non-pertinent click-stream. The pertinent web browser click event may be the URL information, and additional data such as user ID, date, time, event type, and other information may be added to the web browser click event. The ESM 308 may then transmit the pertinent web browser click event to the rules engine 310.

Figure 5:
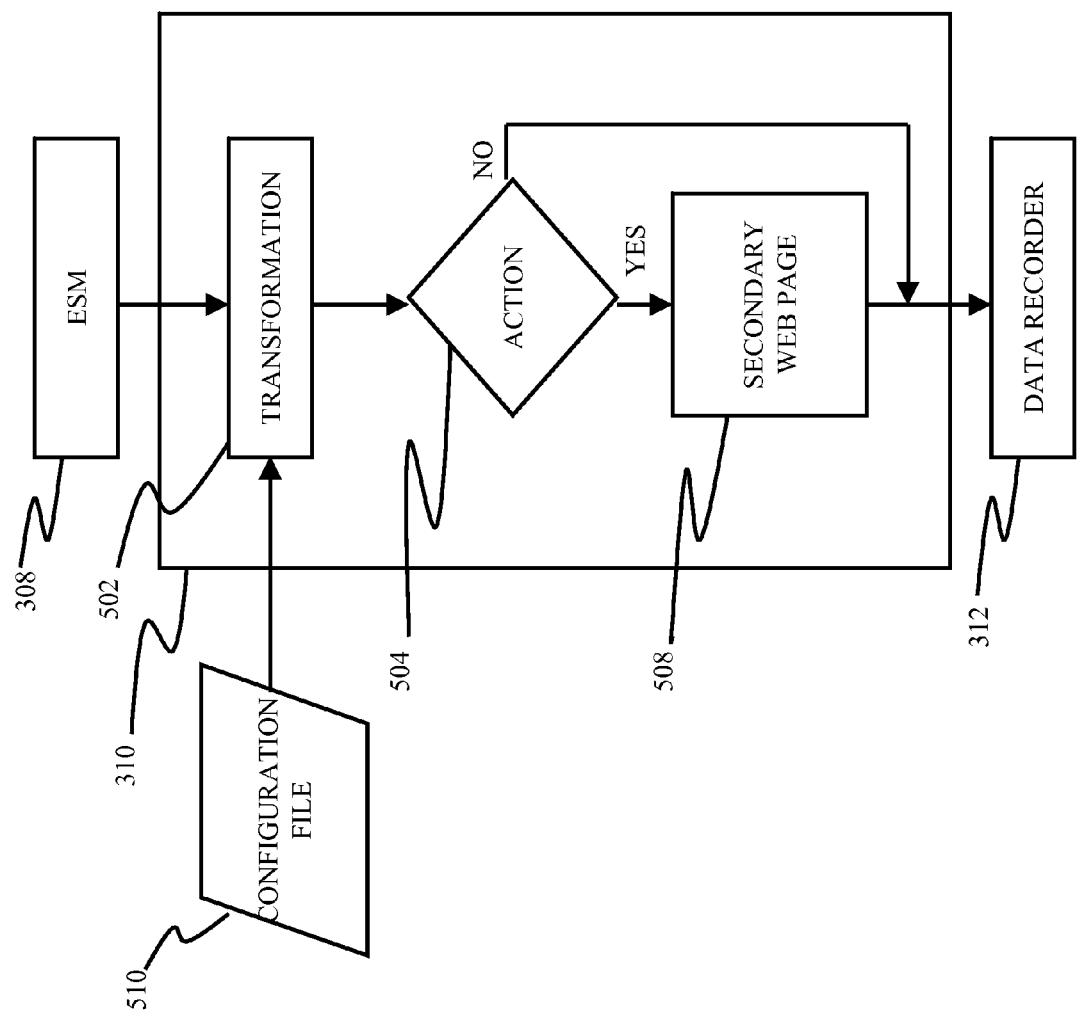
FIG. 5 shows the rules engine according to the principles of the present invention.

Referring to FIG. 5, an embodiment of the rules engine 310 is shown. The ESM 308 may transmit web browser click events to the rules engine 310. In an embodiment, the rules engine 310 may have a transformation sequence 502 for the removal of the user personal information from the web browser click event. The transformation sequence 502 may modify the web browser click event by deleting personal information such as user name, password, account numbers, or similar personal data. The transformation sequence 502 may receive information for removal of personal information from a configuration file 510 that may be received from the DCS 104. In another embodiment, the rules engine 310 may present additional actions 504 based on user actions while browsing the web. The configuration file 510 may maintain information as to user browsing habits that may indicate to the action sequence 504 that one or more actions is to be taken, such as opening a secondary web browser window 508, opening a configuration file, loading rules, modifying rules, recording information about the user, launching an application, or the like. The secondary web browser window 508 may require user interaction such as an on-line survey or other user action. The rules engine 310 may transmit the transformed web browser click event to the data recorder 312.

Figure 6:
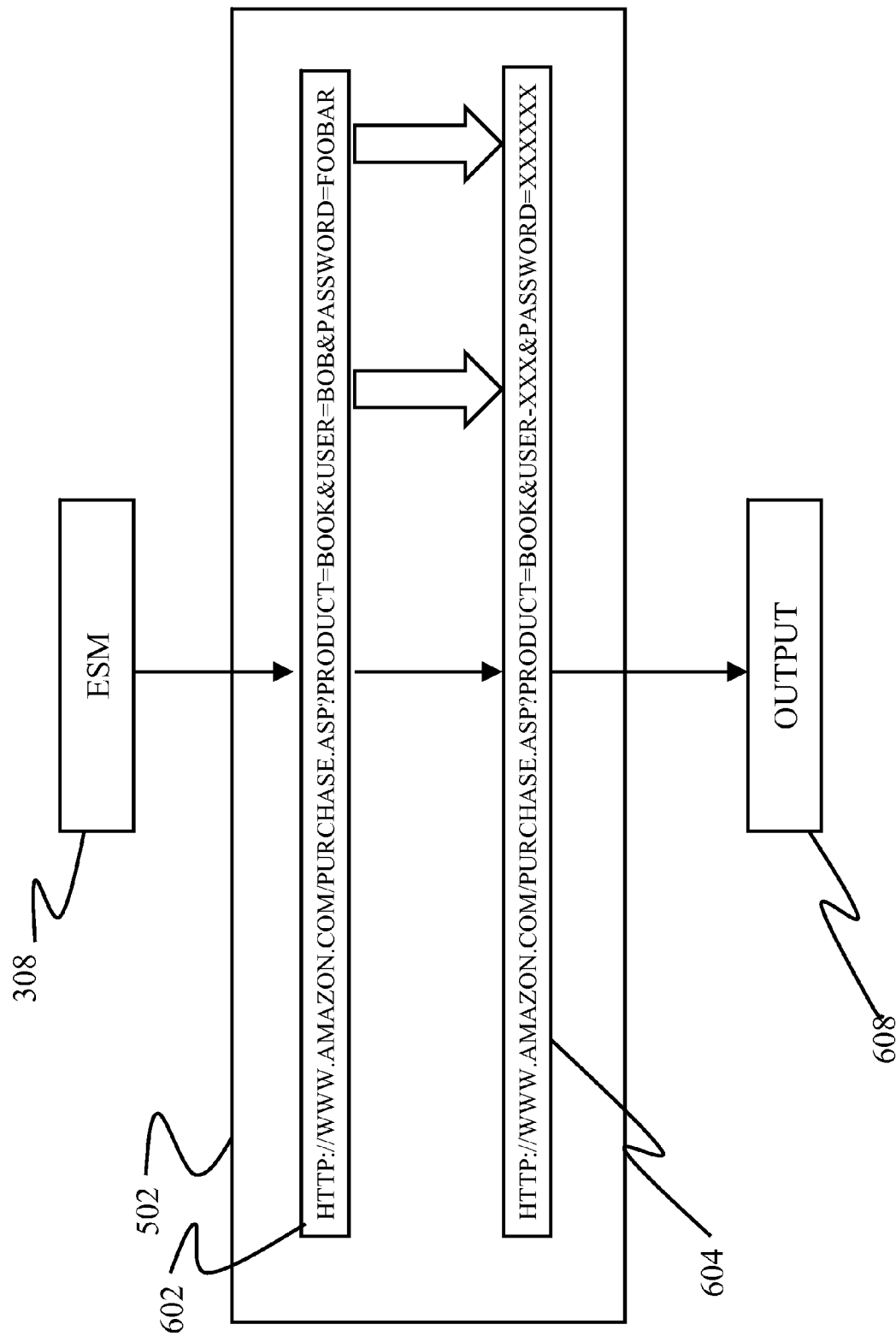
FIG. 6 shows the rules engine transformation according to the principles of the present invention.

Referring to FIG. 6, an embodiment of the rules engine transformation sequence 502 is shown. The ESM 308 may transmit a web browser click event to the rules engine transformation sequence 502. The received web browser click event 602 may be queried for personal data to be removed such as user name, password, account numbers, or similar personal data. The personal data types to be removed may be stored in the configuration file 510 that may be received from the DCS 104. The resulting web browser click event 604 may have its personal data removed by over writing the personal data with another character. The resulting web browser click event 604 may then be output 608.

Figure 7:
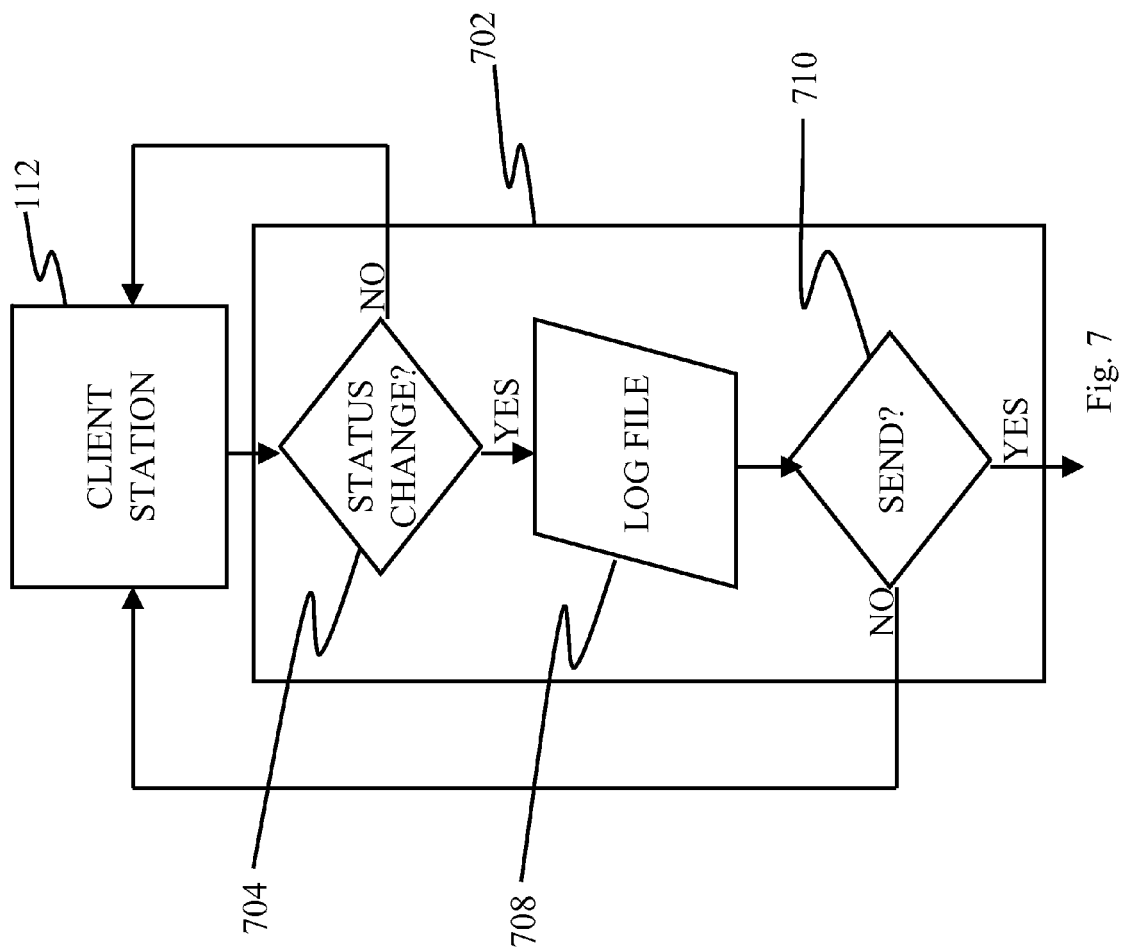
FIG. 7 shows the event logger according to the principles of the present invention.

Referring to FIG. 7, the embodiment of the event logger 702 monitoring the client station 112 is shown. The client station 112 may be executing the DCA 110 while the event logger 702 may be monitoring the client station 112 for any change of operational status 704. Operational events may be an application start, application stop, application re-starts, or other application operation events. In an embodiment, if there are no status changes 704, then the monitoring by the event logger 702 may continue. In another embodiment, if there is a status change 704, then a log file 708 may be created to record the operational status change. The event logger 702 may have a sequence for determination to send 710 the log file 708 or buffer the information for later transmission.

Figure 8:
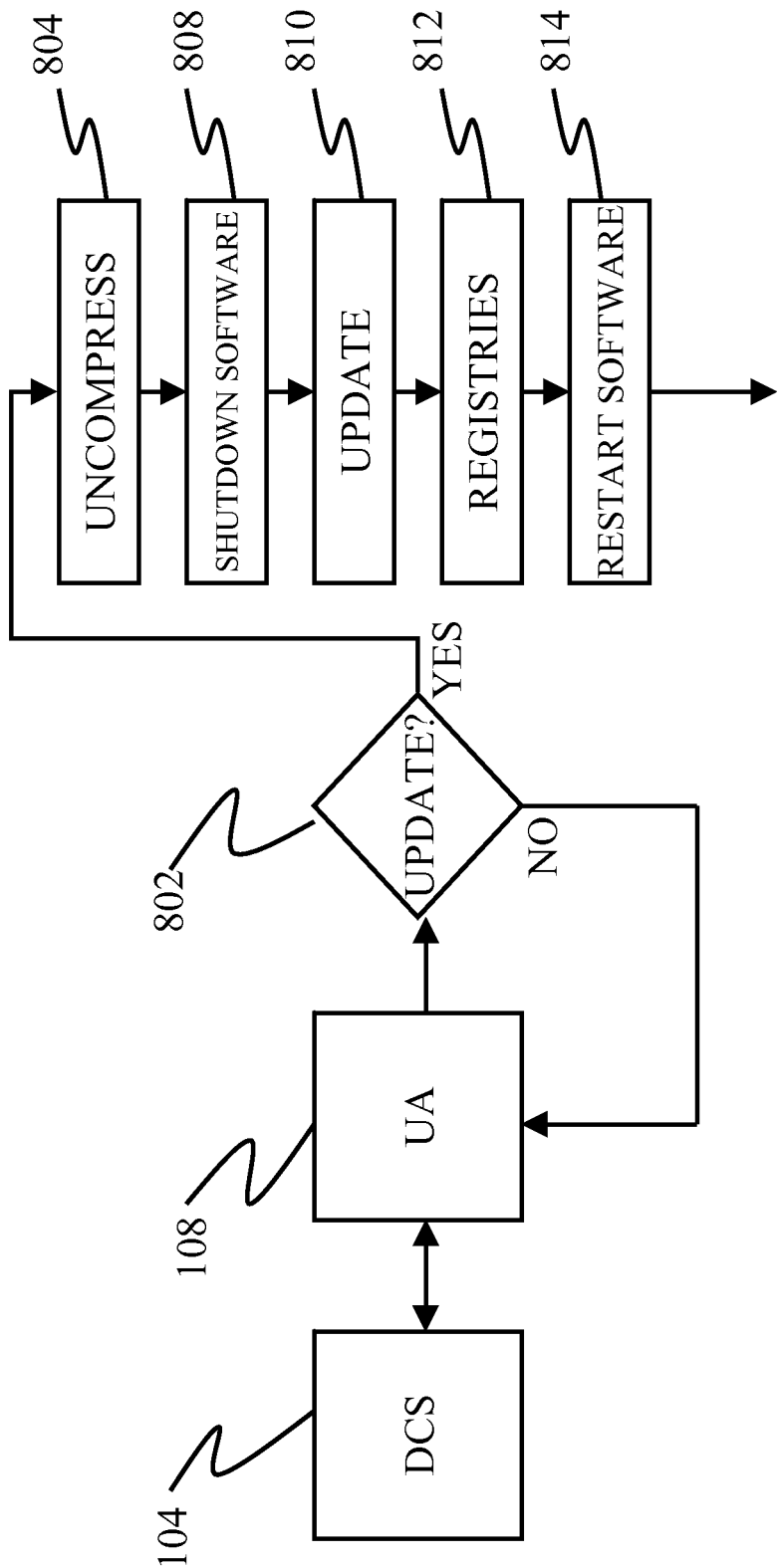
FIG. 8 shows the Update Agent updating the DCA according to the principles of the present invention.

Referring to FIG. 8, an embodiment of the UA 108 updating the DCA 110 is shown. In an embodiment, the UA 108 may download available software updates from the DCS 104 to maintain the DCA 110 in the most up to date version. In an embodiment, an update sequence 802 may determine if an update is available from the DCS 104 and the update may be launched. The download may be received in connection with an installation facility, such as, for example, a Nullsoft Scriptable Install System (NSIS) from Nullsoft. In an embodiment, the update may execute on the client station 112 in a sequence similar to un-compression of the update 804, shut down of required software 808, installation of new update 810, changes to the Registry 812, and restart of the software 814. The sequence of downloading and installing new software updates may run as a background application and may be unnoticed by the user.

Figure 9:
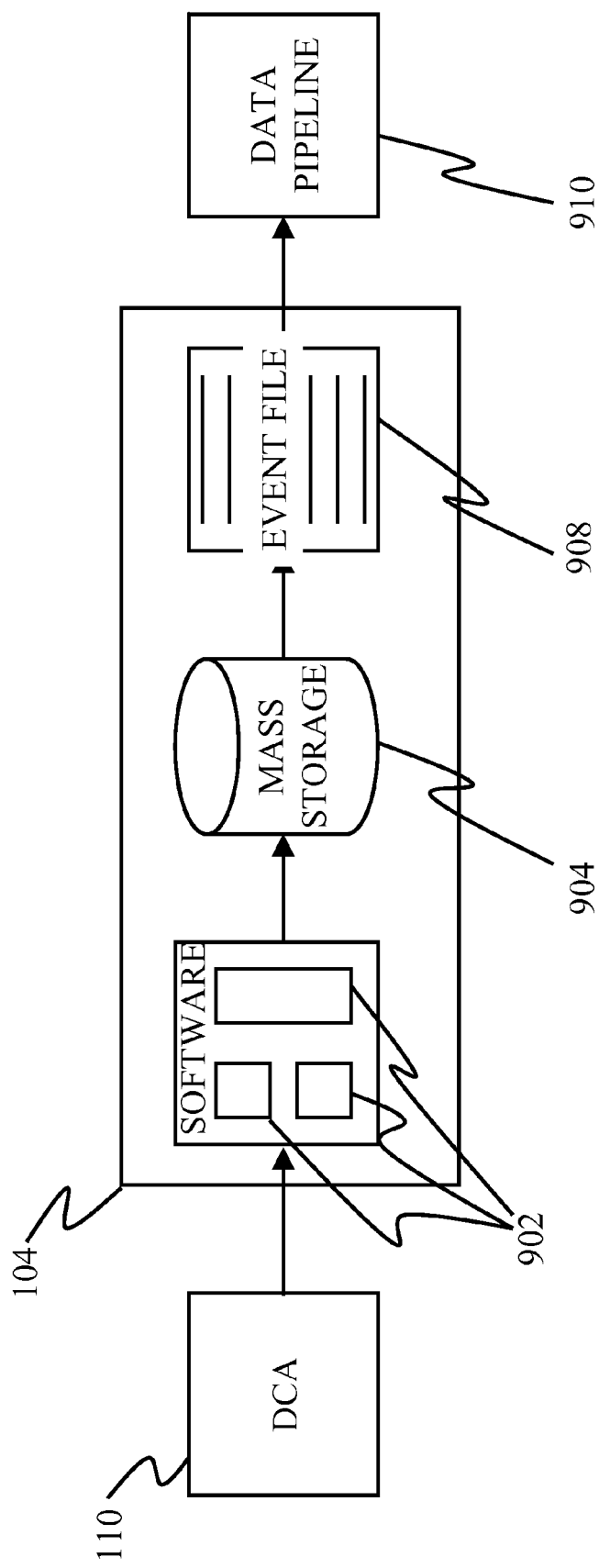
FIG. 9 shows the DCS according to the principles of the present invention.

Referring to FIG. 9, an embodiment of the DCS 104 is shown. The DCS 104 may receive click-stream data from the DCA 110, and the click-stream data may be acted on by a collection of software 902 that may comprise the DCS 104. The click-stream data may be stored on a data storage facility, such as a mass storage device 904. In an embodiment, the DCA 110 may accrue raw events from a plurality of users into at least one raw event file 908; these files may be based on a one to one mapping of DCS 104 servers to raw event logs. The DCA 110 may then transmit the raw event files to a holding area for aggregation by the Data Pipeline 910.

An aspect of the present invention relates to presentation of visual media segment within graphical user interface (GUI) where the visual media segment includes information relating to a user's click stream information, customer service, customer interactions, communications, customer communication, survey questions, survey results, product offers, service offers or other products or services. In embodiments, the visual media segments slide into the GUI from a tool bar. In other embodiments the visualization pops into the GUI, drops into the GUI, or otherwise appears within the GUI. In certain preferred embodiments the visual media segment slides into the GUI from a portion of a tool bar or status bar such as that found in the lower right section of a Windows® application, forming a sliding visual media segment, also referred to herein as a slide or slider. This is an area known for providing status of many processes running on the computer and this area may also be used to slide a visual media segment into the GUI. The visual media segment may be based on usage patterns of a user and the user may have control over the segment (e.g. frequency of sliding in, types of information presented). The visual media segment may provide the user with an indication of the user's worth as judged by others based on the users click patterns. The segment may provide the user with a direct connection to content on the client or on the web. The segment may also be presented to provide bi-directional communications from within the segment. The visual media segment may also include media content such as flash media, video, images and other content. In certain embodiments, the visual media segment is designed to represent a product or service and may include an offer, survey, communication or other information. There are many embodiments described herein relating to the presentation of information through the use of a visual media segment according to the principles of the present invention. In the various embodiments of the invention described herein, visual media segments may be associated with other media segments, such as audio media segments, video media segments, media files, informational media segments, text media segments and the like. In certain other embodiments, certain principles of the invention may be used to generate or execute other types of media segments in the absence of visual media segments.

Figure 10:
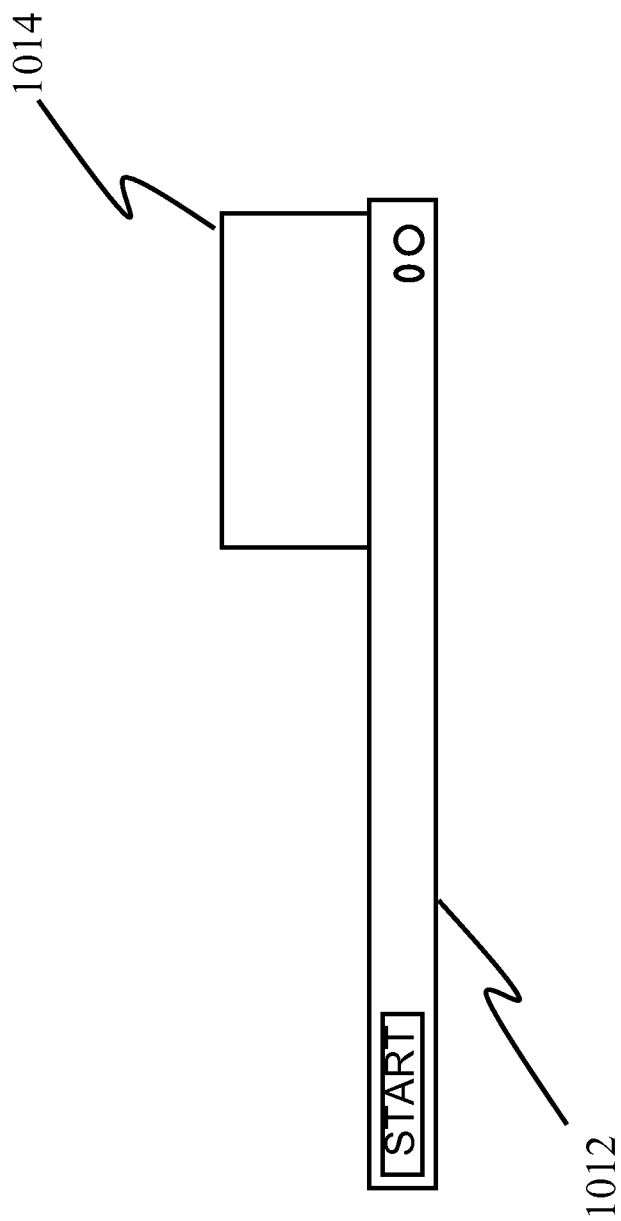
FIG. 10 illustrates an embodiment of a visual media segment according to the principles of the present invention.

FIG. 10 illustrates an embodiment of a visual media segment 1014 according to the principles of the present invention. The visual media segment 1014 may slide into the GUI from a tool bar or status bar 1012 of a Windows environment for example. In this embodiment, a tool bar 1012 is presented at the bottom of a GUI (e.g. above the status icons at the bottom right hand corner of a Windows environment) through a slide presentation. That is, the segment appears to slide into the GUI from within the status bar. The segment software may be client based and may be user controlled. The segment software may also operate in conjunction with other software features described herein, such as click stream monitoring software. For example, once the click stream monitoring software collects enough information to indicate what the user likes, a server based click stream monitoring system may communicate to the user what appears to be relevant information through the visual media segment. A user may also be able to control the appearance, frequency or other parameters associated with the visual media segment through the client based software. In embodiments, the software generating the visual media segments may be referred to as Voicebox.

Figure 11:
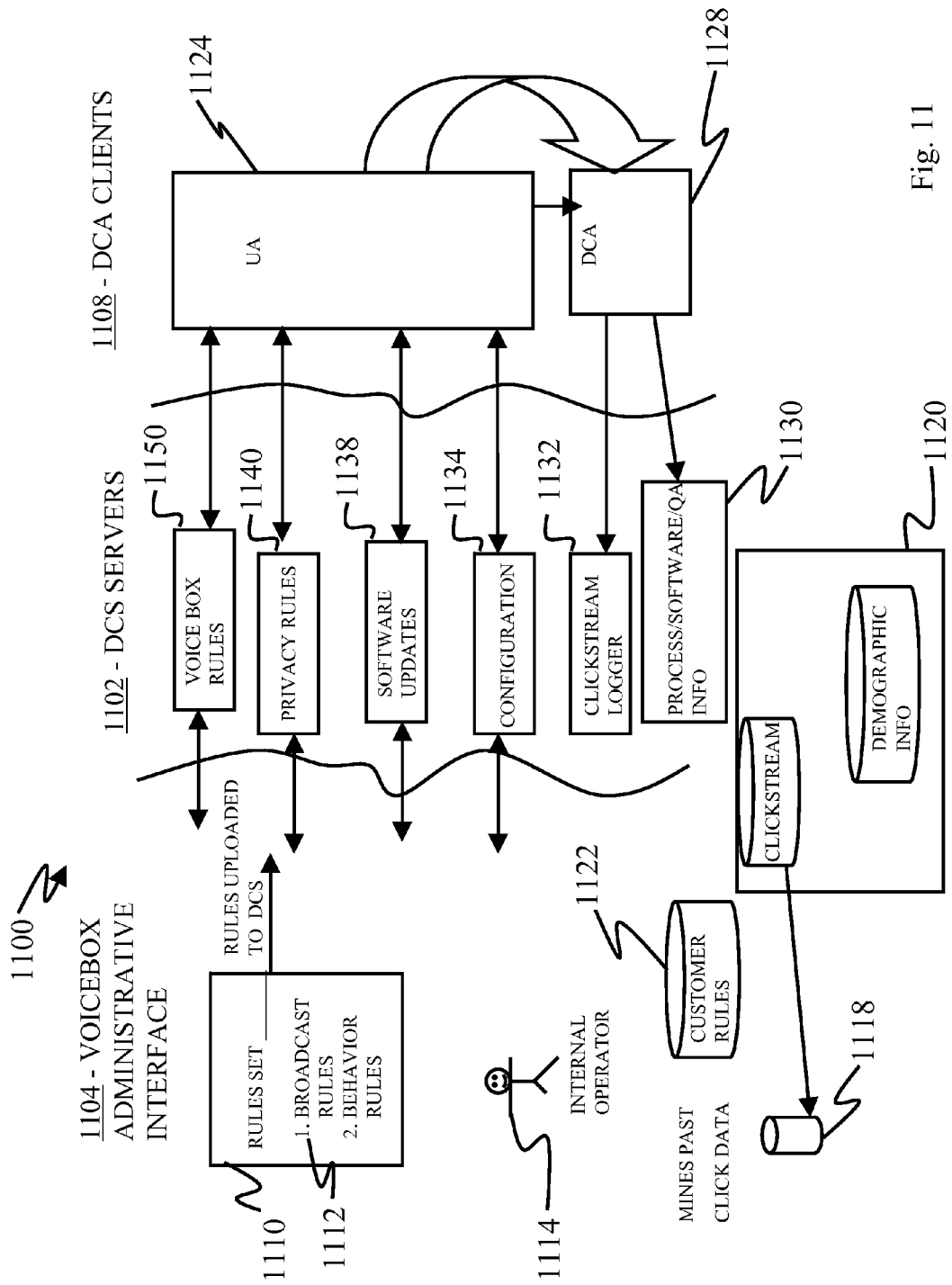
FIG. 11 illustrates a visual media segment generating facility architecture for implementing a visual media segment process according to the principles of the present invention.

FIG. 11 illustrates a visual media segment generating facility architecture 1100 for implementing a visual media segment process according to the principles of the present invention. In this embodiment, the environments are broken up into three main sections: the server environment 1102, the client environment 1108, and the administrator's environment 1104.

The visual media segment generating facility architecture 1100 may include DCA client(s) 1128 may capture information and capture various information (e.g. clicks, as well as process/software info, such as what else is running on desktop). The DCA clients may be adapted to perform functions as described herein for example.

The visual media segment generating facility architecture 1100 may include an update agent 1124 that is adapted to function in coordination with DCA and may be responsible for updating the DCA with voice box rules, privacy rules, software updates, and or configuration rules. The update agent 1124 may receive update information from the DCS servers 1150 for example. In embodiments the UA 1124 updates the DCA 1128 via shared memory and resets the DCA.

The DCA 1128 may also feed the DCS servers 1102 through a clickstream logger 1132 and or a process/software/QA info section 1130.

The DCA 1128 may also feed header information (e.g. in a format such as 1205/1213/userid/config./rules/survey preq). The header may include various forms of identifying information (e.g. what panel/what user/what configuration ID/what rules version/survey information). In embodiments, the every request that is logged is passed along as part of the header. In embodiments, there is a corresponding functional server for each of the DCA and UA functions. In embodiments, the server may not be a separate physical server, but may consist of server functionality which corresponds to each of the DCA and/or UA functions.

The DCS servers 1102 may include functions for Visual media segment generating facility rules 1150, privacy rules 1140, software updates 1138, and configuration rules 1134 as well as other functions that are performed by the DCA. In embodiments, the rules, updates and configurations are embodied in XML.

The visual media segment generating facility administrative interface 1104 may be used to set broadcast rules 1112 (e.g. broadcasting to a whole panel or customers, based on offline data, triggered by any parameter such as configuration settings, rule settings, panel settings or the like). The administrative interface 1104 may also be responsible for setting and communicating behavioral rules (e.g. XML-based rules). For example, the behavioral rules may chain a series of domains together including actions. The chain may include instructions or commands for when a user goes to a particular domain or type of page. For example, when the user goes to the Yahoo Finance refinance page and then goes to the 'Lower My Bills' page, the rules may generate a command that initiates another action, such as opening a secondary page and showing alternative content, such as content associated with a different URL (e.g. an HTML page or tag is triggered), uploading or downloading something (e.g. an executable file), updating software, installing new software, or the like. For example, a user may be delivered files such as a Flash-based file, a visual media segment, an audio segment, a multimedia slider, a slide according to the principles of the present invention, or other file or action. By way of example, the process may include first uploading to the server. The UA may check and know to update the user code so the software is on desktop if they trigger rules. If rules trigger, then it executes on the users desktop. For example, a flash animation, compiled .exe files, or other file that is downloaded beforehand may trigger if the rules match. In embodiments, rule set 1110 that combines broadcast rules 1112 with behavior rules may be generated by the visual media segment generating facility Administrative Interface 1104.

Figure 12:
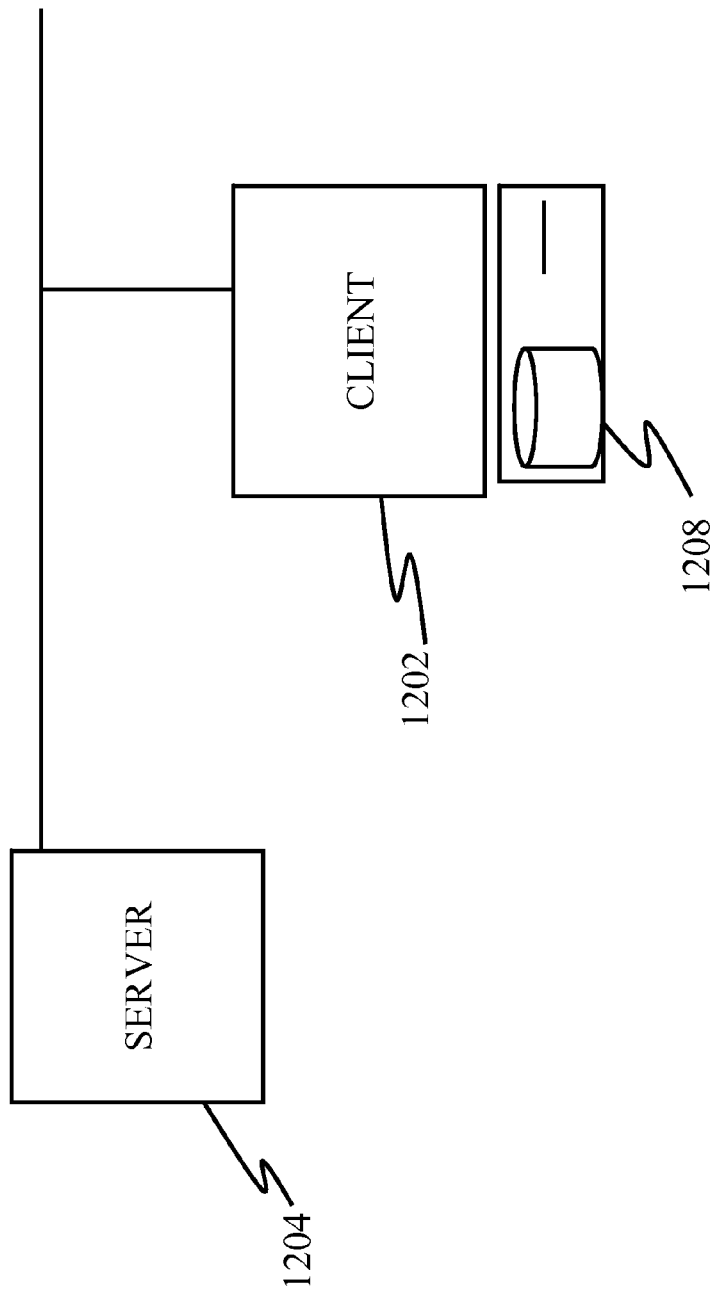
FIG. 12 illustrates a method of providing client software for tracking and communicating with preemptive parameter control according to the principles of the present invention.

FIG. 12 illustrates a method of providing client software for tracking and communicating with preemptive parameter control. The visual media segment generating facility software may be downloaded to a client 1202 from a server 1204 and it may ultimately reside on and execute from internal client memory 1208. The user may retain the ability to control the visual media segment generating facility software and the pop-ups, slide ups and other interactive behaviors of the software. This may present the user with control over the number of advertisements shown over a particular period for example. The client software may also include triggers for rule based behavior of the system. As described above, the rules may be broadcast from a server or they may have been included in the original software, or provided in some other fashion. Rules may be triggered based on usage (e.g. shopping patterns, messaging, purchasing, or transactions). The Visual media segment generating facility software let the user control the experience and interactivity with information and or communications as they are sent to the client. For example, while the user is surfing amazon.com the system may trigger a rule that was originally set by the Administrator. The rule may execute a program that launches a slide-up survey for example. In embodiments, the user may have control over the rules, when they are launched, or other parameters.

There are many actions that may be initiated from within a slide-up according to aspects of the present invention. For example, a user may interact with a slide up for one of the following actions: account information, message center, customer support, listen to ring tones (or other sample products), view products, complete a survey, view video, hear audio, hear ring tones from the phone provider, view pictures, express interest in learning more (or decline), searching, one-click purchasing, shopping cart activities, ordering items or services or other actions.

The user may configure slide-up preferences such as frequency of interactions, when or how many promotional offers to be viewed in a period, to see preview alerts, to show all surveys that qualify for certain criteria, show contest rules, certain type of ads, appearance and color, size of the ads, whether or not there is a sound component allowed, whether to allow video, allow Flash, allow movement across the screen, allow content by age appropriateness (time of day-based), it may be based on an appropriate demographic (e.g. age, gender, income, zip code, education, occupation, cars they drive, cost of home, where you are (location-based slide ups—computer location, home or office computer, connection speed, tests to verify (download a small file and time how long it takes (what is true connection speed)), connection speed, type of connection, what other applications are running (executable names used to QA and see if the application is behaving properly (e.g., whether something is running in the background), RAM, CPU, type of computer, marriage status, status of children, or other information.

Figure 13:
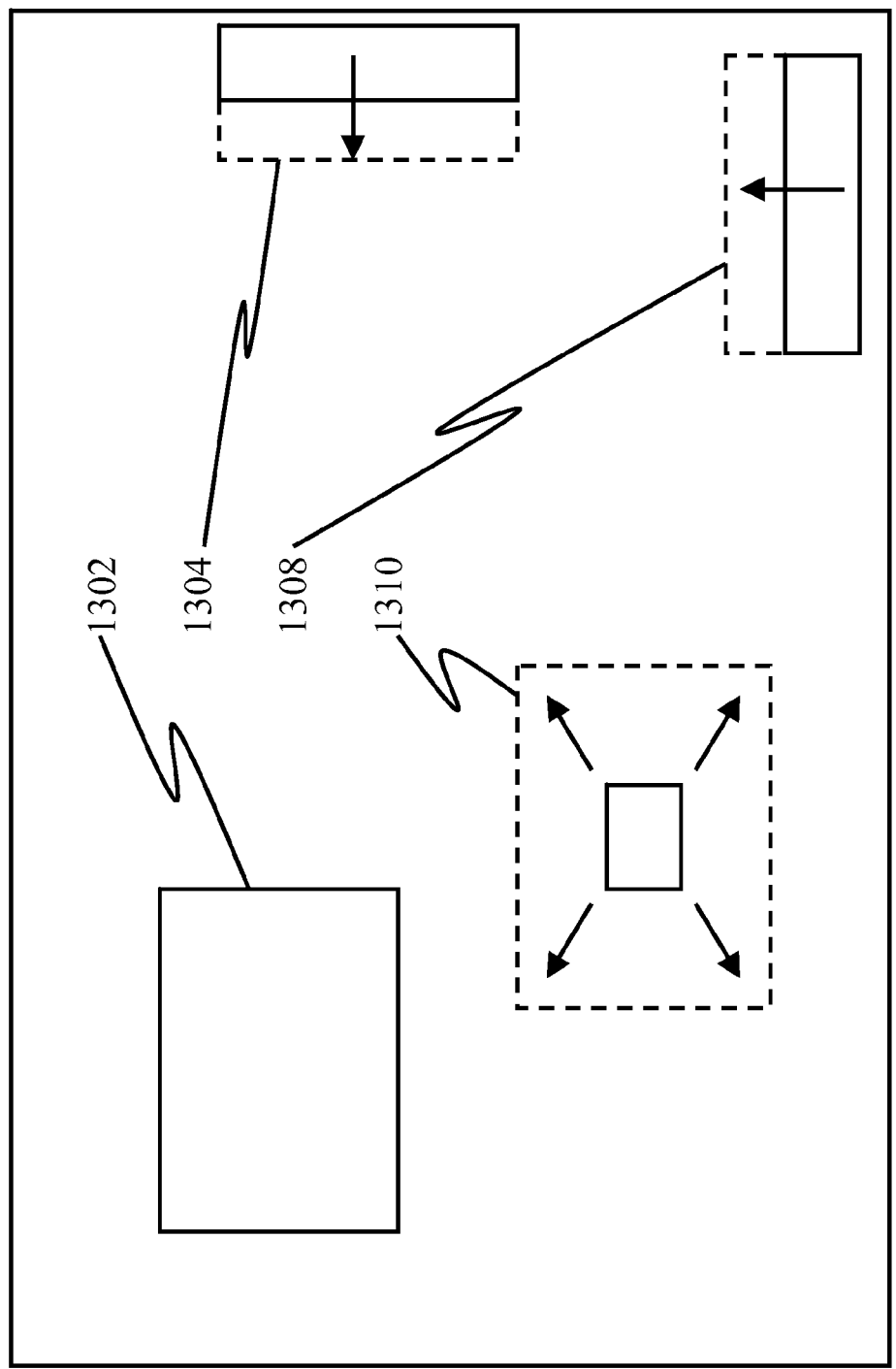
FIG. 13 illustrates various configurations for a visual media segment according to the principles of the present invention.

FIG. 13 illustrates the visual media segment may be provided as a slide-in 1304, slide-up 1308, pop-up 1302 or other type of visual media segment. The user may control aspects of the visual media segment such as whether the visual media segment slides up, slides down, pops up, the size, shape, frequency of appearance, transition effects (e.g. such as growing 1310), what actions can be executed in it, allowing bi-directional communication, allowing communication, if it can include other actions, the visual effects provided with/in the visual media segment (e.g. it may be shaped/skinned (e.g., shaped like a car for auto provider; phone for telephone company, etc.)).

Figure 14:
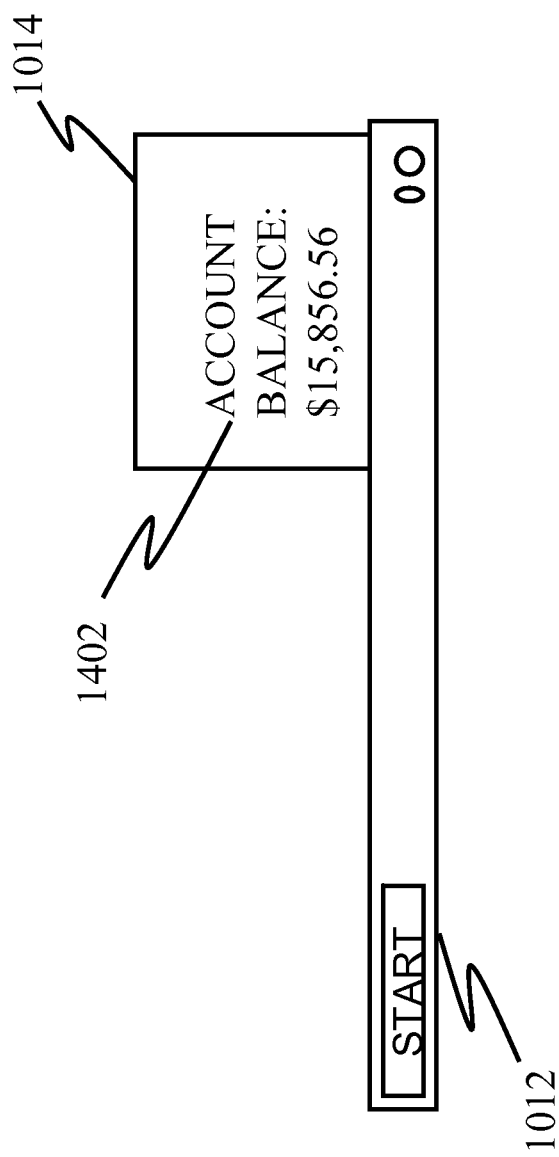
FIG. 14 shows a visual media segment according to principles of the present invention including real time account.

FIG. 14 shows a visual media segment 1014 according to principles of the present invention including real time account information 1402. In embodiments, the visual media segment may tie into shopping mall or other online shopping, may tie into branding, be related to searching or a search engine user interface, or provide other useful interactions. The information included in the visual media segment may include cell minutes, phone minutes, account balance, account transaction information, or music downloads for example. In an embodiment the information may be provided on a real-time basis. In an embodiment, the information may be presented on a historical basis or other non-real-time basis.

A visual media segment according to the principles of the present invention may include account information. A method associated with presenting the account information may involve presenting a visual media segment in the graphical user interface of a user device; and displaying account information for a user account within the visual media segment. The account information may be account information for an account the user has with a service provider. The visual media segment may include account information for more than one account from a service provider. The user may be able to execute a transaction associated with the account by taking an action entirely within the visual media segment. The account information may be information from more than one service provider. The account information may be collected using a client-side application installed on the user's computer. The account information may access a security item located on the user's computer. The security item may be a stored password. The security item may be a password entered in the visual media segment. In embodiments, the account is selected from the group consisting of a bank account, a savings account, a retirement account, an investment account, a checking account, a credit card account, a debit card account, a store account, a loyalty program account, an airline miles account, a hotel reward program account, a rental car account, an account for a utility, an account for a telecommunications service, an account for a television service, an account for a personal service, an account for a home service, an insurance account, a mortgage account, and a tax account. The account information may be collected using server-side software. In embodiments, the methods may also involve tracking a usage pattern of the user of the computing facility and presenting a selected visual media segment based on the usage pattern. The visual media segment may allow the user to pay a bill based on an action of the user entirely within the visual media segment.

A desktop slide-in visual media segment according to the principles of the present invention may be based of the usage patterns of the user and the user may have control of the presentation of the visual media segment. The slide-in may include account information, information pertaining to account types, movie rentals, music (e.g. ITUNES account information), and software/game account information.

Figure 15:
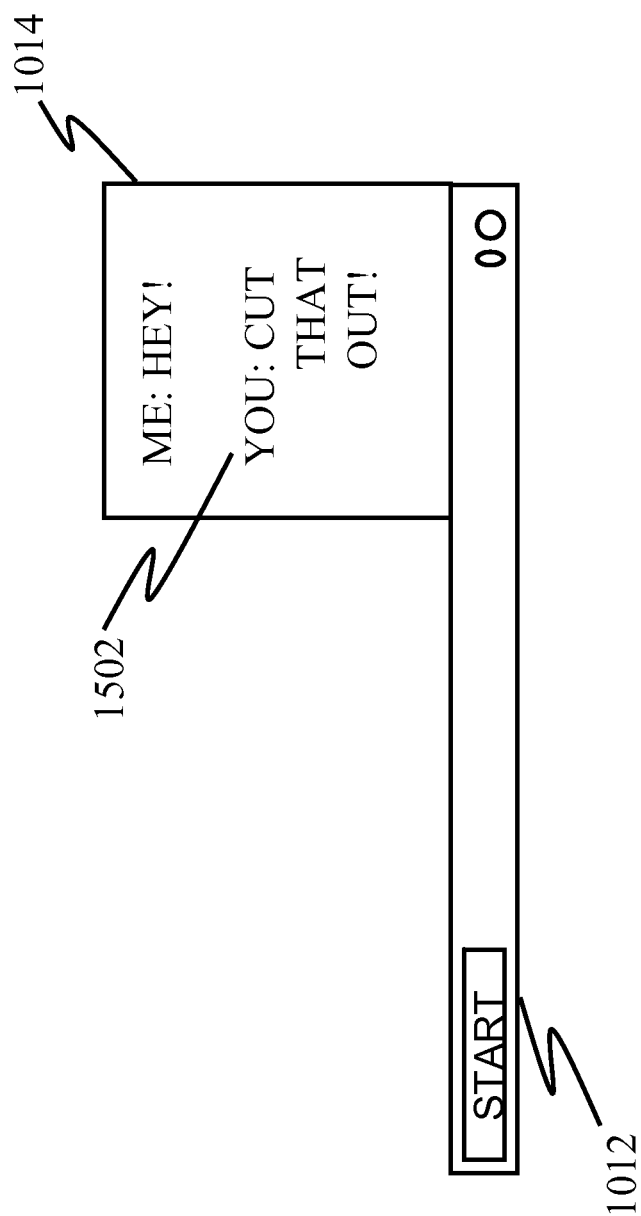
FIG. 15 illustrates a slide up visual media segment including a user action segment according to principles of the present invention.

FIG. 15 illustrates a slide up visual media segment 1014 including a user action segment 1502 according to principles of the present invention. In this embodiment, the user action segment 1502 includes an instant messaging facility. In embodiments, the user action segment 1502 may include provisions that include providing that the action takes place entirely within the slide up visual media segment and or not opening an application or a browser window to further facilitate the action. The action segment may be adapted to provide one-click shopping, an offer, an acceptance, a click through, a message (e.g. email, IM, SMS), completion of a survey, communication back to a marketer, viewing a worth, viewing the user's worth, viewing or interacting with account information (e.g. transfer/balance check/payment), a PAYPAL facility, a bidding facility (e.g. to view or submit a bid to an auction), or other actions.

Figure 16:
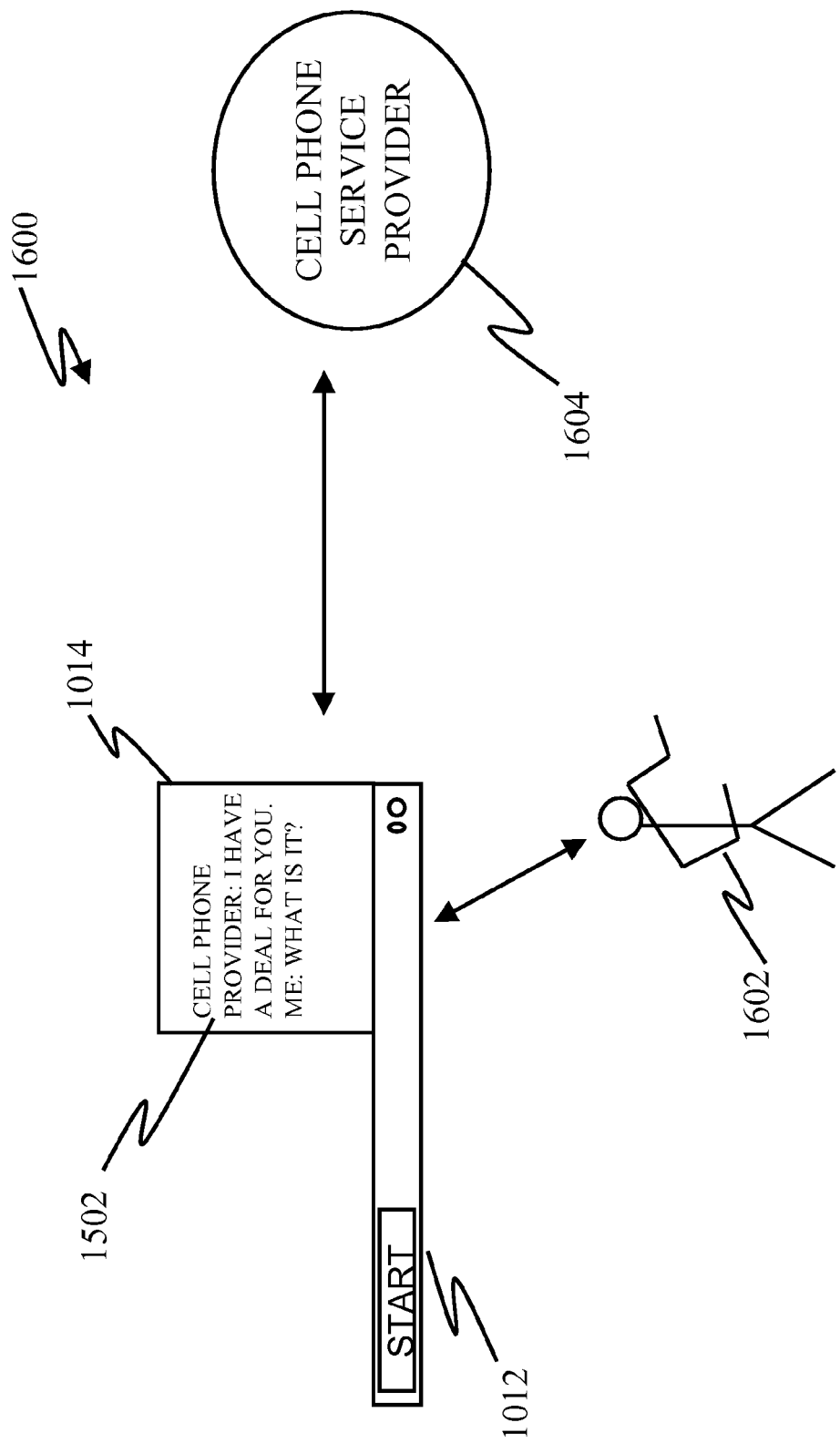
FIG. 16 illustrates a method of communication according to the principles of the present invention.

FIG. 16 illustrates a method of communication 1600 according to the principles of the present invention. The method may include a service or product provider 1604 (e.g. cell phone service provider) and a customer 1602 wherein the communication between the two is facilitated through a slide up visual media segment 1014 including a communication action facility 1502. In embodiments, the method of communication may include bi-directional communication. In embodiments, the communication may involve communication with a marketer, service provider, product provider, search facility, bank, support provider, contractor, or other person or entity. In embodiments, the communication may be triggered through a rule or other event. The communication may be related to seeing a value associated with yourself or others, taking actions, communication initiated by your service provider, marketer initiated visual media segment that allows communication, communications about accounts, communications about offers and revised offers and prices, availability, service, shipping options/details, support (e.g. technical, psychological, social), warranty options, warranty, contract terms and conditions, contract terms that can be varied, under coating, options/packages, up sale to a better model, interest rate/financing offers, minutes packages, loans, credit card offers, points/miles/promotions, bill payment (refinancing), debt restructuring, travel packages, upgrade to first class, hotel room for trip, rental car for trip, restaurant information, points balance information, when and how you can use points, travel packages, schedule alerts, special offers for travel items, pharmaceuticals, health, recalls, generic drug alternatives, alternative prescriptions, drug use information (e.g. when to take medication or where or when to inject), scheduling, community for disease sufferers, or other areas.

An aspect of the present invention relates to providing a visual media segment in a user's computer facility based on the user's usage patterns. Embodiments further relate to providing the user control over such visual media segments.

Figure 17:
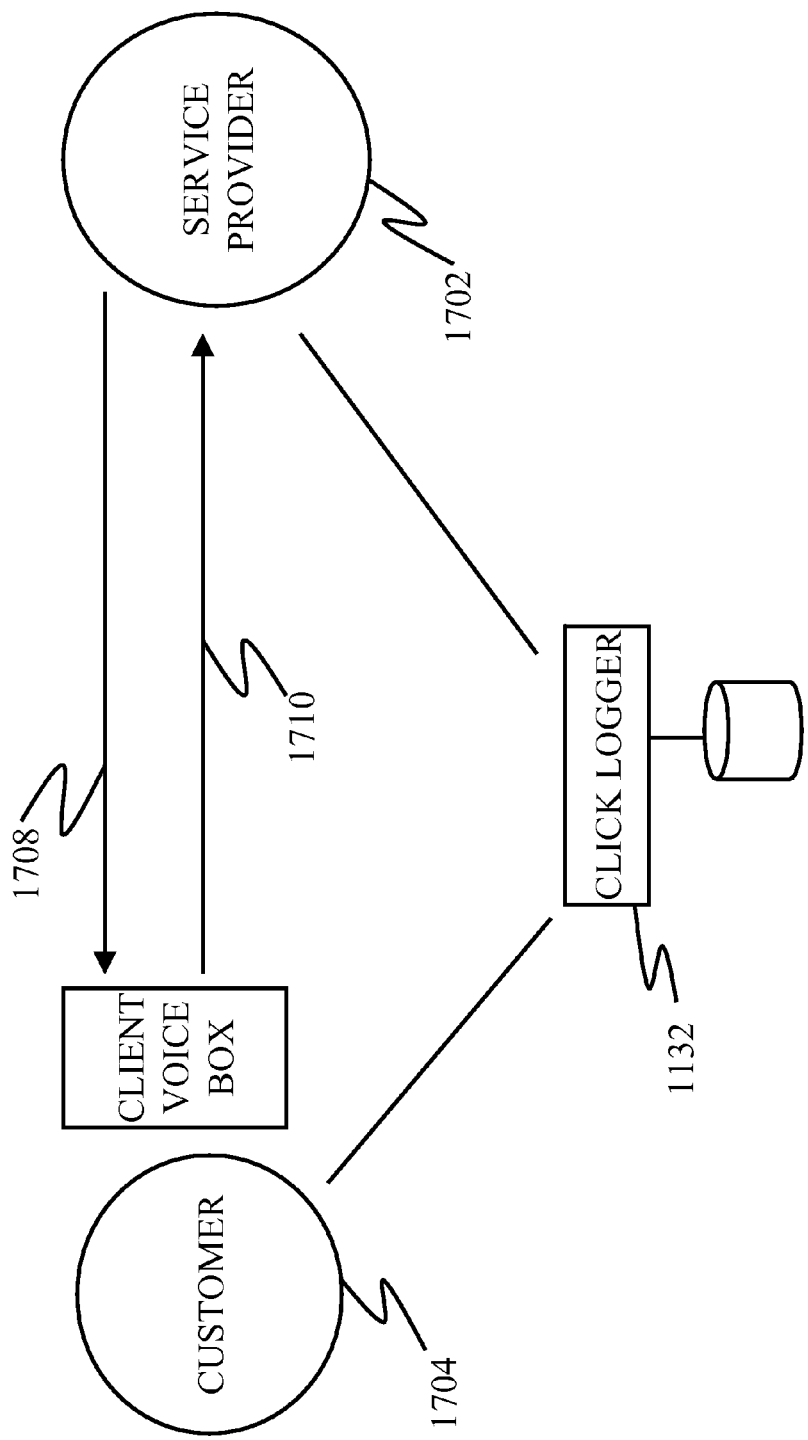
FIG. 17 illustrates a method for providing visual media segment based at least in part of the user's usage patterns according to the principles of the present invention.

FIG. 17 illustrates a method for providing visual media segments based at least in part on the user's usage patterns. In this embodiment, a customer 1704 may use a computing facility including Visual media segment generating facility and DCA software according to the principles of the present invention. A click logger 1132 may track the behavior of the customer and pass certain behavior onto a service provider 1702. The service provider may already be a service provider to the customer or be a prospective service provider. The user's privacy rules may allow for the passing of certain information to third parties, such as current service providers, competitors of current service providers, or other third parties of interest. The service provider may realize that its customer 1704 is thinking of switching service providers because they are looking at competitive sites for example. The service provider 1702 may then communicate a new offer to the customer through a communication through the client based Visual media segment generating facility software. Based on the rules, and other control factors set by the user, the Visual media segment generating facility software may generate a slide up visual media segment including the offer or information relating to the offer.

In embodiments, a slide up visual media segment's presentation may be regulated by a user's computer usage patterns. The computer usage patterns may be based on usage patterns at multiple network domains. For example, one may make inferences based on complex behavior of the user based on the selection of domains. In embodiments, the behavior may be judged on more than one domain, two domains, or three or more domains. In embodiments, the computer usage behavior may be based in part on a click-through or multiple click throughs at a particular domain. In embodiments, the usage behavior may be based in part on data from a customer. Information from a customer may be used to augment other computer usage behavior as well.

Figure 18:
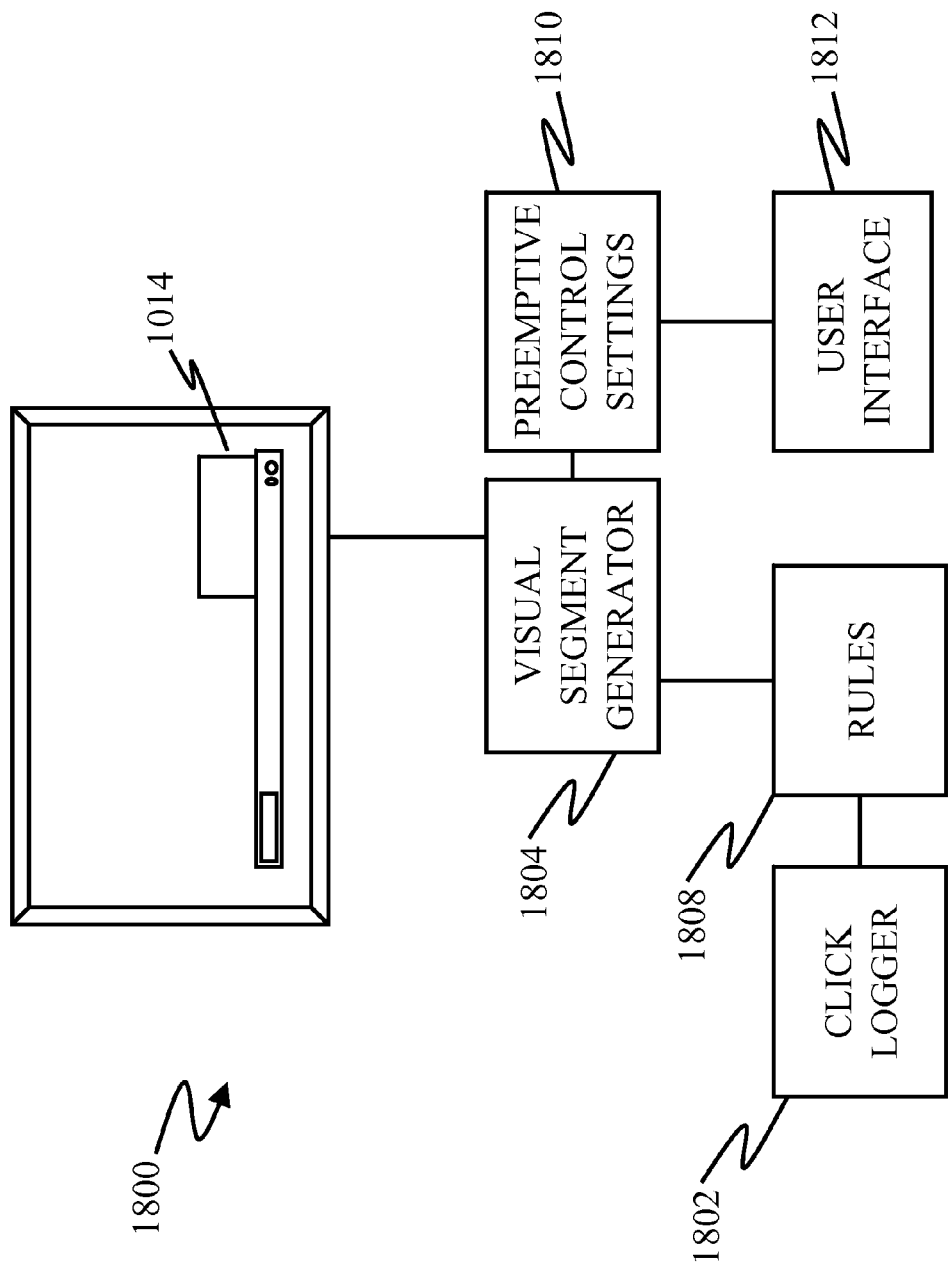
FIG. 18 illustrates a visual media segment generation facility according to the principles of the present invention.

FIG. 18 illustrates a visual media segment generation facility 1800. The visual media segment generation facility may include software with several components, such as a visual media segment generator 1804, a preemptive control settings facility 1810, a user interaction tracking facility (e.g. a click logger 1802), a rules facility 1808 and a user interface 1812. The system may be adapted to track a usage pattern by which a user uses a computing facility (e.g. through tracking of on-line or off-line click behavior through the click logger 1802). The system may also be adapted to present a visual media segment 1014 on a graphical user interface associated with the user, wherein the content of the visual media segment is based at least in part on the usage pattern; wherein the user has at least partial preemptive control over a presentation parameter associated with the visual media segment (e.g. through interaction with the preemptive controller and it settings 1810). The graphical user interface may be associated with a portable computing device, a laptop computing device, a desktop computing device, a phone, a cell phone, a PDA, mobile communication facility or other such facility for example. As described herein, the visual media segment 1014 may be a segment that slides up from the lower menu bar of a computer screen, a pop-up segment on a computer screen, or other form of visual media segment. The visual media segment may appear as a transparent, semi-transparent, or translucent visual media segment.

Figure 19:
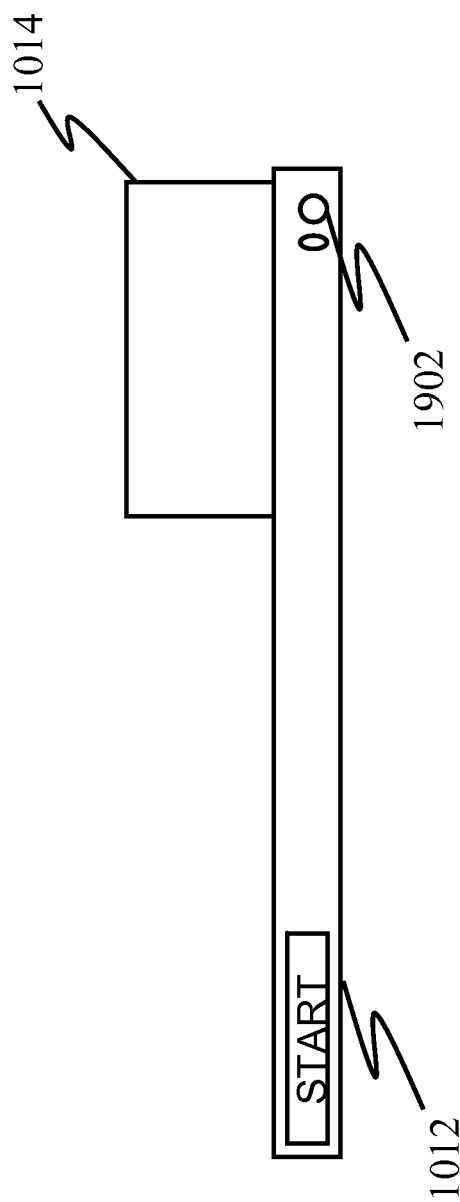
FIG. 19 illustrates an alert facility adapted to alter a user of information pertaining to a visual media segment according to the principles of the present invention.

FIG. 19 illustrates an alert facility 1902 adapted to alter a user of information pertaining to a visual media segment 1014. For example, the alert 1902 may show up on a tool bar or within the alert or information section of a toolbar and provide a user with an indication that a visual media segment 1014 is ready to appear. The alert facility may be an alert on a toolbar, change in appearance within an icon on the toolbar, an icon on the toolbar. The client software may provide a tool to be located on a tool bar. The tool may be a presentation regulation tool wherein the presentation regulation tool regulates a presentation parameter associated with a visual media segment. The client software may provide a tool bar containing tools for the regulation of the visual media segment.

Referring back to FIG. 18, a user may have preemptive control over the appearance and or content of the visual media segment 1014 through interaction with the preemptive control settings 1810. For example, the user may control a presentation parameter such as frequency of appearance of the visual media segment. The frequency may be regulated in steps. The steps include high, medium and low. The frequency may be regulated by the number of visual media segments allowed in a given period. The given period may be measured as the number allowed in a day, week, month, quarter, year or other period of time. The controlled presentation parameter may determine a size of the visual media segment when it appears. The presentation parameter may relate to a color. The presentation parameter may be a location of the visual media segment. The presentation parameter may be an indication of who is sending, responsible for, or associated with a visual media segment.

Figure 20:
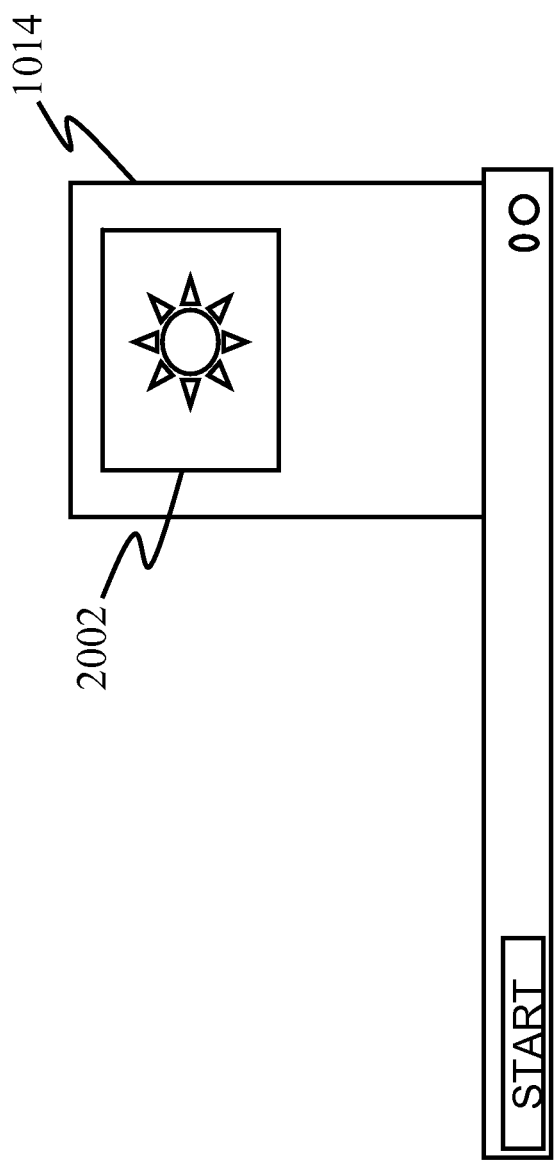
FIG. 20 illustrates a visual media segment including an image zone according to the principles of the present invention.

FIG. 20 illustrates a visual media segment 1014 including an image zone 2002. The image zone may include a logo, an HTML image, an animation, flash animation, picture, video, movie, advertisement or other image. The visual media segment may include an advertisement. The advertisement may include a motion component. The advertisement may include a video segment. The video segment may include streaming video. The video segment may include a movie.

Figure 21:
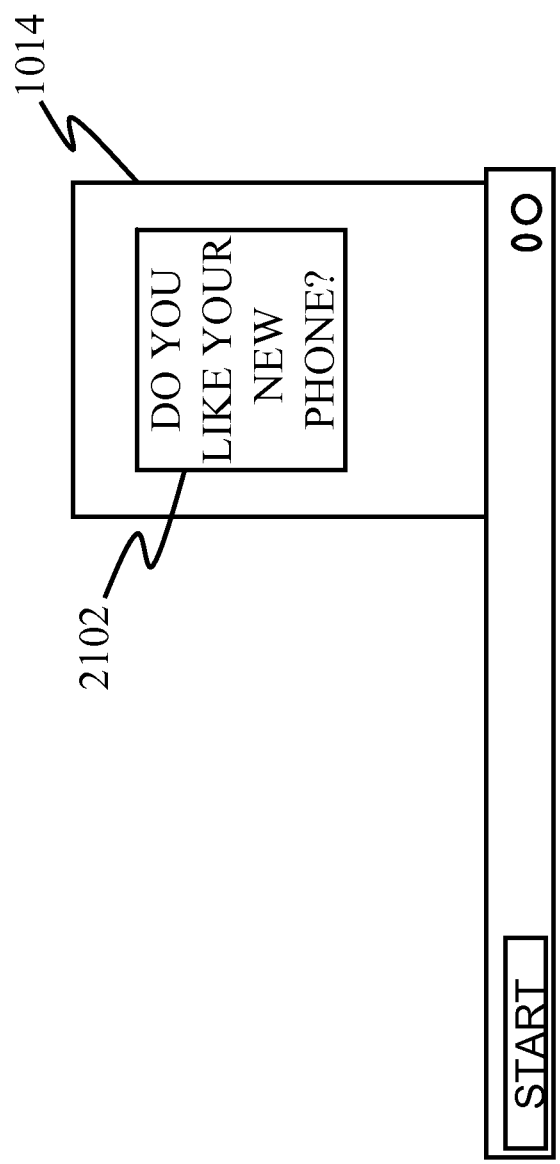
FIG. 21 illustrates a visual media segment including a survey according to the principles of the present invention.

FIG. 21 illustrates a visual media segment 1014 including a survey 2102. The survey may generate two-way interactions, one-directional interactions, or other interactions to solicit information relating to a survey subject. The survey subject may relate to a service, product, event, time, duration, satisfaction or other parameter of interest in a survey. For example, the survey may relate to health care, service plans, service, product sales, advertising, communication, or other topic.

Figure 22:
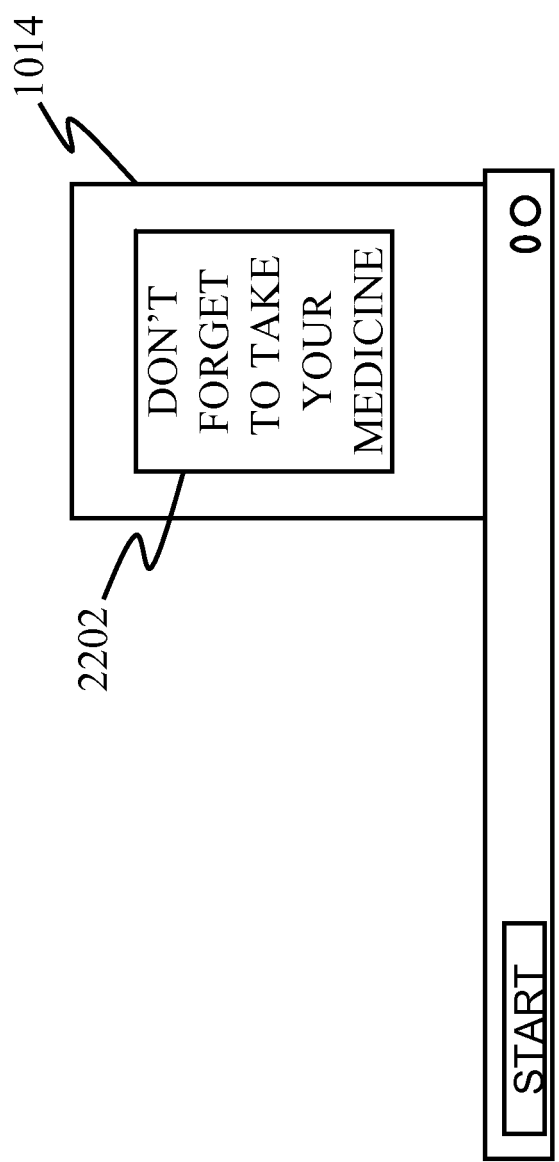
FIG. 22 illustrates a visual media segment including a reminder according to the principles of the present invention.

FIG. 22 illustrates a visual media segment 1014 including a reminder 2202. The visual media segment may include reminders relating to the user's health for example. The reminder may relate to medication. The reminder may relate dosage, injection, intravenous intake, change of medication, time, type of medication, or other information relating to medication and or health. The reminder may relate to vitamins. The reminder may relate to food, nutrition, a biometric measurement, blood pressure, blood sugar, heart rate, cholesterol, blood oxygen content, lung capacity, temperature or other parameter. The reminder may relate to an economic contribution, contribution to an education plan, contribution to a savings plan, contribution to a retirement plan, or a payment for example.

Figure 23:
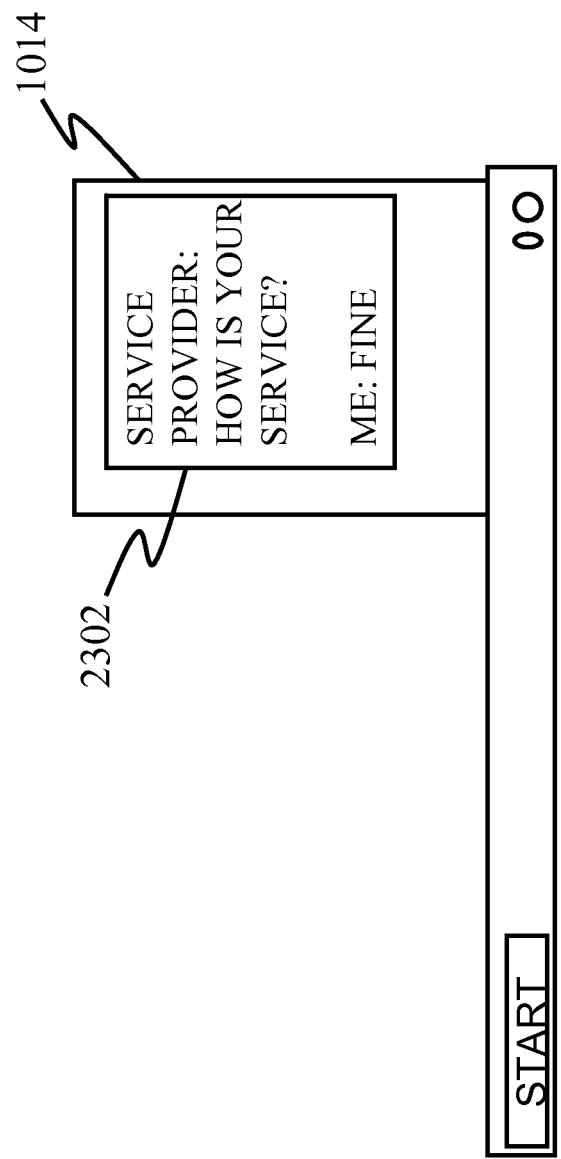
FIG. 23 illustrates a visual media segment including a message segment according to the principles of the present invention.

FIG. 23 illustrates a visual media segment 1014 including a message segment 2302. The message segment may be adapted for two-way communication (e.g. instant messaging, email messaging, SMS). The message segment may be adapted for one-way communication (e.g. advertisement communication from a service provider). The message may be associated with a service provider of the user (e.g. a cell phone service provider, an auto service provider, a product supplier). The message segment may include an offer. The offer may be for goods, services, sale of goods, sale of services, rental of goods, or rental of services. The offer may be related to a usage pattern of the user and or computing facility (e.g. tracking of where the user is going on the web, tracking what services the user is looking at on the web, tracking what products the user is looking at on the web). The service provider is may be the user's cell phone service provider, credit provider, credit card provider, bank, school, credit report provider, power provider, electric provider, gas provider, broker, or financial analyst. A method of communications may be deployed to connect a service provider with its customer wherein the user associated with the visual media segment is the customer. The visual media segment may be adapted with a two-way communication facility. The communication may be initiated by the service provider, or other third party, and the communication may be initiated through the service providers understanding of the user's on-line behavior for example. The usage pattern may be associated with webpage usage, purchases, economic transactions, high worth transactions, service provider interactions or competitor interactions.

While many of the embodiments describe client software as the regulatory software within the system, it should be understood that configuration, regulation, setting and other control software may be server based. In embodiments, the interactions from a service provider and the like may be directed through a server application for example and the server application may be directed to send and or receive information from the client according to the principles of the present invention.

A method of providing bidirectional communication through a visual media segment may involve providing a slide-up visual media segment for presentation on a graphical user interface of a user; and enabling bidirectional communication within the slide-up visual media segment. The communication may include a message from an advertiser. The communication may include an offer and allows acceptance of the offer. The communication may enable the formation of an agreement. The communication may enable the setting of a parameter for further communication. The communication may be between a user and a marketer. The method may also involve tracking a usage pattern of the user and the communication may be based on a usage pattern of the user.

An aspect of the present invention relates to ascribing a user a value based on their computer usage behavior. A method according to the principles of the present invention may involve tracking a usage pattern of a user of a computing facility; attributing a value that is ascribed to the user by another based on the usage pattern; and presenting the user with an indicator of the ascribed value.

In embodiments, the value ascribed to the user reflects the value of the user to a service provider. The value ascribed may be based on a prediction of a future behavior of the user. The future behavior may include a predicted purchase. The value ascribed may be based on an observed preference of the user based on the user's computer activities. The preference may be observed based on a pattern of online behavior by the user. In embodiments, the preference may be indicated directly by the user, as opposed to being inferentially obtained. For example, the preference may be indicated through the interaction with a survey.

In embodiments, the value ascribed may be based on the execution of a transaction by the user using the computing facility. For example, the transaction may be a purchase, a sale, shopping, click-through to a link, bid, offer to purchase a good or a service, observation of an advertisement, message, a mouse movement, submission of a form, competition of a survey.

In embodiments, the user is presented with information about how the value of the user's usage is determined. In other embodiments, information about how the value of a user's usage pattern is determined is withheld from the user. In embodiments, presenting the ascribed value includes presenting a visual media segment on a graphical user interface associated with the user. For example, the visual media segment is a slide menu that slides up from a tool bar, the visual media segment is a pop-up segment, the visual media segment is a bar indicator, or the visual media segment may be presented through other methods as described herein.

In embodiments, the user's worth is measured in worth to a service provider, the worth comprises worth as measured by an advertiser, the user's worth is measured in worth to a product provider, the user's worth is based on the frequency with which a user permits presentation of a visual display to the user, the user's worth is based on a profile of the user based on the user's usage pattern or the user's worth is measured on other such parameters. In embodiments, the profile is created based on an accumulation of transactions by the user. The accumulation of transactions may facilitate an estimate of the net worth of the user. The accumulation of transactions may facilitate a prediction of the price at which a user will purchase at least one of a good and a service.

In embodiments, a user may be presented with an indication of the user's worth as attributed by others based on computer usage patterns. The worth may be at least in part based on transactions, offers, sales, bids, click through, mouse events, evidence of looking at something, income, net worth, profile over time (e.g. complex behaviors), evidence of looking at a competitive service provider (e.g. the user's present wireless carrier is Verizon but the user is also looking at other wireless plans (indicating they may be in a "churn mode" getting ready to switch service providers), usage patterns that are useful in particular vertical market areas, patterns that allow one to infer value score, behavior through more than one site, behavior on a given site, behavior on a present service provider site, or other behavior.

An aspect of the present invention relates to a visual media segment where one or more offers are presented to the user. Within the visual media segment, the user may be required to, rewarded for, or capable of electing to receive more information or performing a transaction associated with the offer(s). For example, a method of communicating an offer may involve presenting an offer to a user associated with a more link to indicate more information on the offer is desired and a no more link to indicate no further information on the offer is desired; and attributing a value to each action of the user in response to the offer. In embodiments, the value comprises worth as measured by a service provider, as measured by an advertiser, as measured by a product provider or as measured by another third party.

Figure 24:
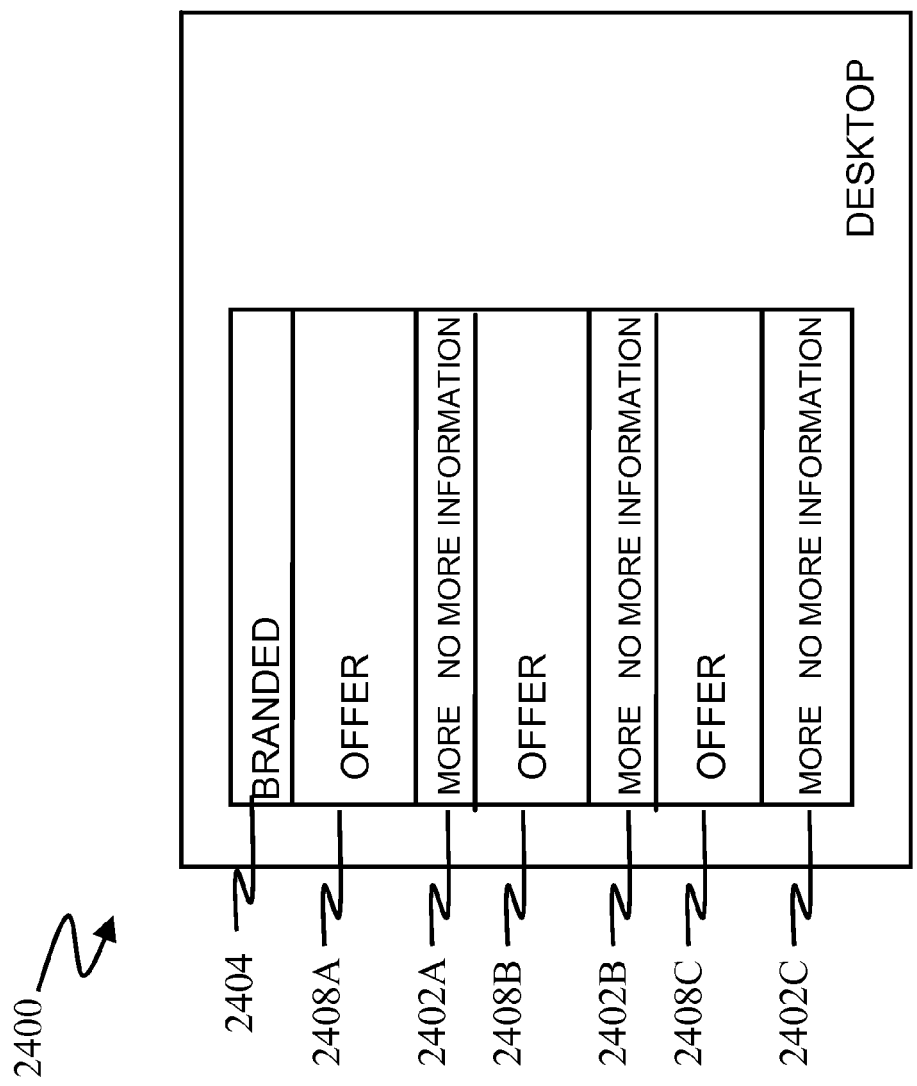
FIG. 24 illustrates an offer visual media segment according to the principles of the present invention.

FIG. 24 illustrates an offer visual media segment according to the principles of the present invention. The visual media segment may contain one or more offers 2408 (e.g. offers for the sale of goods, offers for the sale of services, offers for travel, offers for real estate rentals or sales) The visual media segment may also be branded 2404 with a logo, tag line, service mark, trademark or other indicia indicating the origin of the offer(s). The visual media segment may also include an action bar 2402 where the user may interact with one or more of the offers. In embodiments, if the user selects a button to see more information, the user may see content, offers, sales, or there may be an interaction with a service provider or the like. The user's indication of "not interested" may be used to build a user profile (e.g. it may trigger an increase or decrease in point score based on categories of things they are not interested in). Showing lack of interest in low value things may mean interested in high value things and this may lead to better offers or higher valuation for the user. The system may track a pattern of expressed interest over time to indicate the value. The pattern may be observed based on human evaluation of the pattern.

An aspect of the present invention relates to methods and systems for providing client software for tracking and communicating with preemptive parameter control. In embodiments, the methods and systems may involve providing communication software adapted to track a usage pattern of a user of a computing facility through the presentation of a visual media segment on a graphical user interface associated with the user based at least in part on the usage pattern, wherein the user has at least partial preemptive control over a presentation parameter associated with the visual media segment. The methods and systems may also involve establishing a loyalty sign up panel associated with a service provider; presenting a description of a loyalty program; and allowing a user to download software to enable the tracking of the usage pattern.

Figure 25:
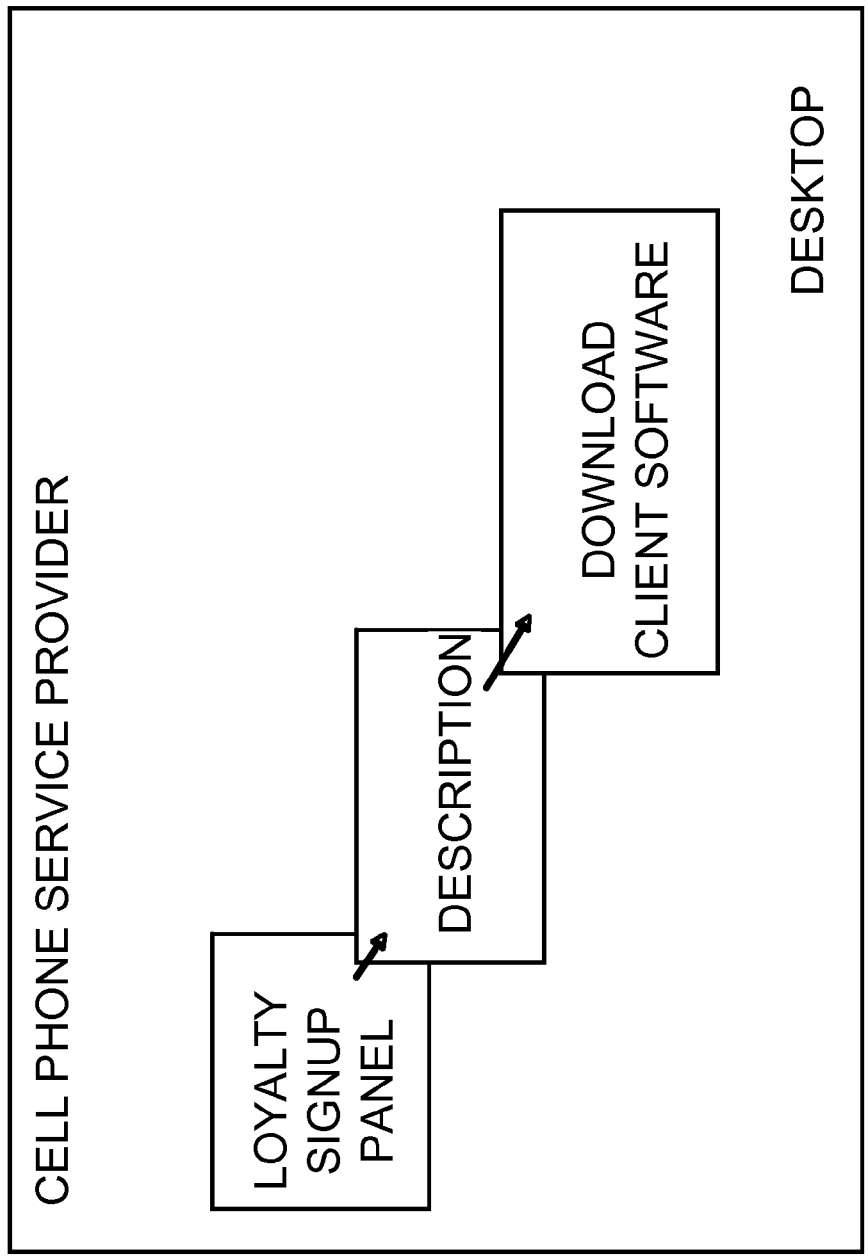
FIG. 25 illustrates a method for signing up for a loyalty program according to aspects of the present invention.

FIG. 25 illustrates a method for signing up for a loyalty program according to aspects of the present invention. A service provider (e.g. a cell phone service provider) may provide a loyalty sign-up panel 2502 associated with the service provider's website. A user may click on the sign-up panel 2502 to receive more information about the loyalty program 2504. If the user elects to sign up for the loyalty program, the user may receive client software that allows visual media segment information system according to the principles of the present invention. For example, the user may download client software to allow the types of interactions described in connection with FIGS. 11-24.

An aspect of the present invention relates to a visual media segment that facilitates user action without proceeding through a link. A method may involve providing a slide-up visual media segment for presentation on a graphical user interface of a user; and allowing a user to execute an action within the slide-up visual media segment with a single action of the user. The action may be the execution of a transaction, setting a parameter, a promotion presented to the user in the visual media segment, purchase of goods, viewing of an offer, joining a loyalty program, purchase of a service, viewing an advertisement, sending the visual media segment to another user, providing for some other action. The sending of the visual media segment may cause the user to receive a reward for example.

An aspect of the present invention relates to an auction method that allows marketers to bid for access to users. The method may involve tracking the usage pattern of a computer facility by a user; presenting the usage pattern to a plurality of marketers; and attributing a value to the user based on an auction among the marketers. The method may also involve presenting the user a visual media segment that represents the value attributed to the user based on the auction. The method may also involve allowing a subset of marketers to interact with the user based on the results of the auction. The number of marketers allowed to interact with the user may be determined based on a parameter set by the user. The user may set the parameter within a visual media segment presented to the user.

Figure 26:
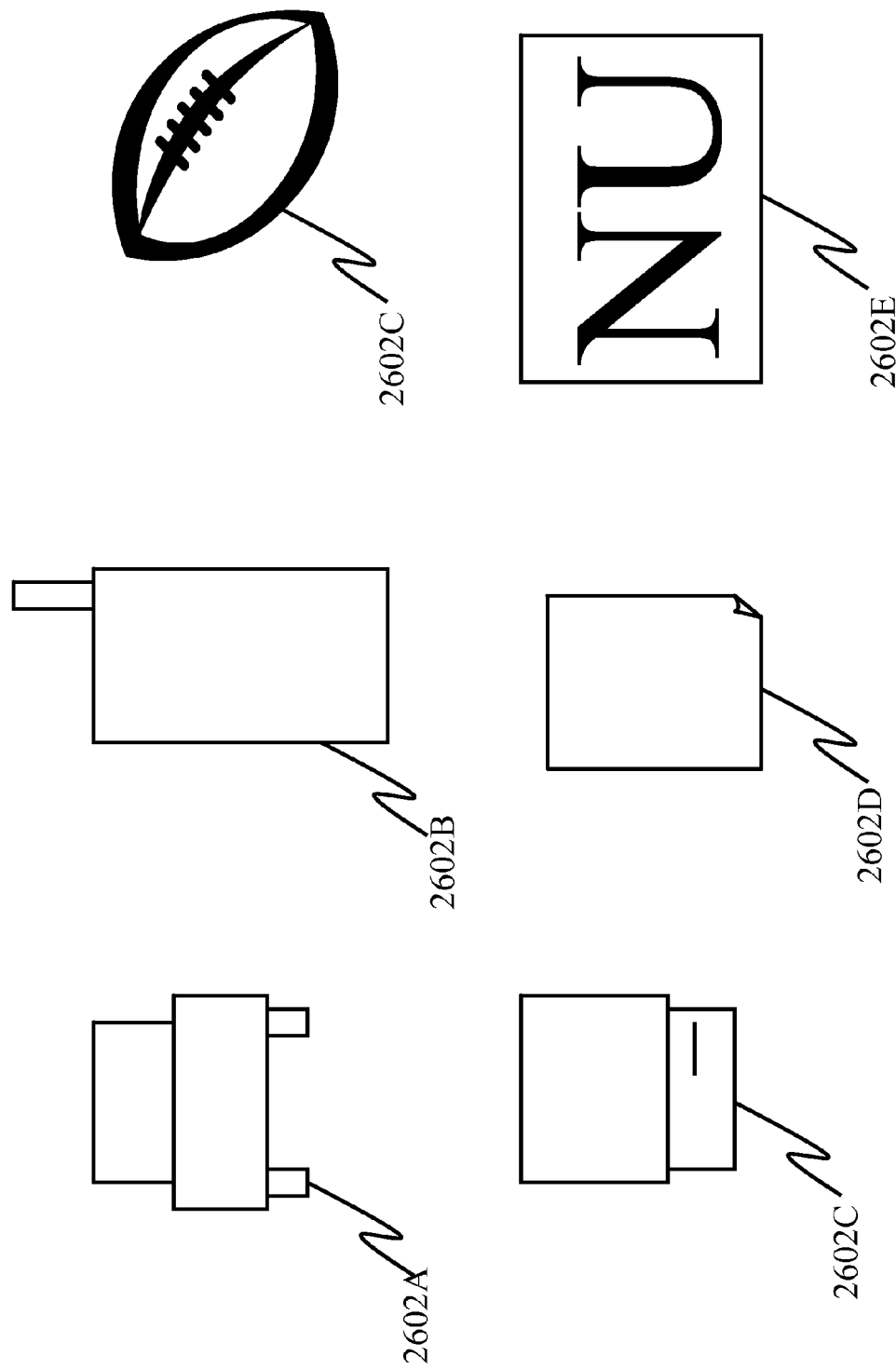
FIG. 26 illustrates several embodiments of the visual appearance of a visual media segment according to the principles of the present invention.

An aspect of the present invention relates to visual media segments and their appearance. FIG. 26 illustrates several embodiments of the visual appearance of a visual media segment according to the principles of the present invention. In embodiments, the visual media segment may take on an appearance in coordination with a message or information associated with the visual media segment. For example, an automotive dealer or service provider may communicate with a user via a visual media segment and the visual media segment may appear in the user's desktop in the form of an automobile 2602A. The automobile may take on a generic form of an automobile or it may take on the shape, features, colors or other attributes of a particular vehicle. If the company sending the message to the user is Chevrolet for example, the appearance may take the form of a Corvette. If the company is Range Rover, the visual media segment may look like an SUV. If the communication associated with the visual media segment is related to a cell phone provider or cell phone service provider, the visual media segment may take on the form of a cell phone 2602B. If the communication associated with the visual media segment is related to sports, the visual media segment may take on the form of a football 2602C or other sports icon. If the communication associated with the visual media segment is related to a computer provider or computer service provider, the visual media segment may take on the form of a computer 2602C or other such icon. If the communication associated with the visual media segment is related to an office supplies provider, book supplier or the like, the visual media segment may take on the form of a book, paper 2602D or other goods and or services to make the association. A visual media segment may include an embossed or watermark style feature as indicated in 2602E. A method of providing a visual media segment may involve providing the visual media segment and associating the visual media segment's appearance with the communication associated with the visual media segment. The association may involve generating an appearance that represents an icon of the information associated with the visual media segment. A visual media segment may also include multimedia including image(s), video, animation, audio, or other such effects.

There are many applications and environments for which a visual media segment facility according to the principles of the present invention may be used. For example, such a system may be used in a club for a given service provider (e.g. club membership actions displayed in the slide-up menu), cell phone service providers, book sellers, consumer goods retailers, electronics retailers, service providers, product providers, non-profit organizations, for-profit organizations, retailers, government agencies, government facilities, military facilities, utilities, auto dealers, auto manufacturers, auto service providers, education facilities, health facilities (e.g. hospitals, gyms, rehabilitation facilities), medical facilities, auction facilities or other facilities, agencies and providers.

While the invention has been described in connection with certain preferred embodiments, it should be understood that other embodiments would be recognized by one of ordinary skill in the art, and are incorporated by reference herein.

What is claimed is:

1. A method comprising:
   providing a data collection agent (DCA) that:
      records web browser click events across a plurality of web sites,
      identifies a subset of pertinent web browser click events,
      produces transformed web browser click events from the pertinent web browser click events by removing user personal information from the web browser click events, wherein removing user personal information comprises replacing, on a character by character basis, personal information in the web browser click events with a plurality of characters, wherein personal information includes at least one of: a user name, a password, or an account number, and
      transmits a click-stream of the transformed web browser click events to a data collection server (DCS) that resides on a computer, the DCA embodied as a web browser plug-in on a user client station;
   receiving the transformed web browser click events from the DCA, as a click-stream, at the DCS to record and provide a user usage pattern; and based on the user usage pattern and a presentation parameter, inviting a user to participate in a survey, in which the presentation parameter at least in part determines a frequency of survey invitations to the user; and the presentation parameter can be controlled by the user.

2. The method of claim 1, wherein the survey is presented on a visual media segment of a graphical user interface of a computing facility.

3. The method of claim 1, wherein the usage pattern is a real-time usage pattern.

4. The method of claim 1, wherein the usage pattern is a historical usage pattern.

5. The method of claim 1, wherein the survey generates two-way interactions.

6. The method of claim 1, wherein the survey generates one-direction interactions.

7. The method of claim 1, wherein the survey relates to at least one of a service, a product, an event, a time, a duration, a satisfaction, a communication, and another parameter of interest.

8. The method of claim 1, wherein the survey relates to health care.

9. The method of claim 1, wherein the survey relates to a service plan.

10. The method of claim 1, wherein the survey relates to a product sale.

11. The method of claim 1, wherein the survey relates to advertising.

12. A system comprising:

a plurality of data collection agents (DCA) that:

record web browser click events across a plurality of web sites, identify a subset of pertinent web browser click events, produce transformed web browser click events from the pertinent web browser click events by removing user personal information from the web browser click events, wherein removing user personal information comprises replacing, on a character by character basis, personal information in the web browser click events with a plurality of characters, wherein personal information includes at least one of: a user name, a password, or an account number, and transmit a click-stream of the transformed web browser click events to a data collection server (DCS) that resides on a computer, each of the plurality of DCA embodied as a web browser plug-in on a user client station;

the DCS that both receives the click-stream of the transformed web browser click events and collects user online activity based on the click-stream of the web browser click events; and a visual media segment of the web browser that invites a user to participate in a survey based on a user usage pattern and a presentation parameter that determines, at least in part, a frequency with which the user is invited to participate in a survey, wherein the presentation parameter can be controlled by the user.

13. The system of claim 12, wherein the usage pattern is a real-time usage pattern.

14. The system of claim 12, wherein the usage pattern is a historical usage pattern.

15. The system of claim 12, wherein the survey generates two-way interactions.

16. The system of claim 12, wherein the survey generates one-direction interactions.

17. The system of claim 12, wherein the survey relates to at least one of a service, a service plan, a product, an event, a time, a duration, a satisfaction, a communication, and another parameter of interest.

18. The system of claim 12, wherein the survey relates to health care.

19. The system of claim 12, wherein the survey relates to a product sale.

20. The system of claim 12, wherein the survey relates to advertising.

* * * * *